US012651296B2

(12) United States Patent
Robotham

(10) Patent No.: US 12,651,296 B2
(45) Date of Patent: *Jun. 9, 2026

(54) SYSTEMS, APPARATUS AND METHODS FOR IDENTIFYING AND SECURELY STORING DISTINGUISHING CHARACTERISTICS IN A DISTRIBUTED LEDGER WITHIN A DISTRIBUTED LEDGER-BASED NETWORK BASED ON FUNGIBLE AND NON-FUNGIBLE TOKENS

(71) Applicant: EYGS LLP, London (GB)

(72) Inventor: John Stoddard Robotham, Belmont, MA (US)

(73) Assignee: EYGS LLP, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,282

(22) Filed: Oct. 31, 2024

(65) Prior Publication Data

US 2025/0054063 A1      Feb. 13, 2025

Related U.S. Application Data

(62) Division of application No. 17/966,443, filed on Oct. 14, 2022, now Pat. No. 12,169,869, which is a
(Continued)

(51) Int. Cl.
*G06Q 40/04* (2012.01)
*G06Q 20/38* (2012.01)
(Continued)

(52) U.S. Cl.
CPC ......... *G06Q 40/04* (2013.01); *G06Q 20/3829* (2013.01); *H04L 9/3218* (2013.01); *H04L 9/50* (2022.05); *H04L 63/0442* (2013.01)

(58) Field of Classification Search
CPC .... G06Q 10/08; G06Q 20/3829; G06Q 40/00; G06Q 40/04; H04L 9/0643;
(Continued)

(56) References Cited

U.S. PATENT DOCUMENTS

| | | | |
|---|---|---|---|
| 5,892,900 A | 4/1999 | Ginter et al. | |
| 7,574,383 B1 | 8/2009 | Parasnis et al. | |

(Continued)

FOREIGN PATENT DOCUMENTS

| | | |
|---|---|---|
| CN | 107274184 A | 10/2017 |
| CN | 109074557 A | 12/2018 |

(Continued)

OTHER PUBLICATIONS

Andreev, O., "Hidden in Plain Sight: Transacting Privately on a Blockchain. Introducing Confidential Assets in the Chain Protocol," [Online], Retrieved from the Internet: URL: https://blog.chain.com/hidden-in-plain-sight-transacting-privately-on-a-blockchain-835ab7 . . . ], Retrieved on Aug. 27, 2018, 11 pages.
(Continued)

*Primary Examiner* — Wodajo Getachew
(74) *Attorney, Agent, or Firm* — COOLEY LLP

(57) ABSTRACT

In some embodiments, a method includes storing data associated with fungible assets in a distributed ledger database. The method includes dividing fungible tokens into a first set of groups of fungible tokens based on the data and sending, via the distributed ledger-based network and based on an asymmetric cryptography key pair, each group of fungible tokens from the first set of groups of fungible tokens to a communication device from the first set of communication devices to cause the second plurality of communication devices to send, to a designated recipient communication device, non-fungible tokens for each group of fungible tokens from the second set of groups of fungible tokens. The
(Continued)

first set of groups of fungible tokens is divided into a second set of groups of fungible tokens and received at a second set of communication devices.

20 Claims, 5 Drawing Sheets

Related U.S. Application Data division of application No. 16/952,949, filed on Nov. 19, 2020, now Pat. No. 11,481,841.

(60) Provisional application No. 62/938,210, filed on Nov. 20, 2019.

(51) Int. Cl.
    H04L 9/00 (2022.01)
    H04L 9/32 (2006.01)
    H04L 9/40 (2022.01)

(58) Field of Classification Search
    CPC ....... H04L 9/3218; H04L 9/3239; H04L 9/50;
    H04L 63/0442; H04L 63/0807; H04L
    2209/56
    USPC .......................................................... 705/67
    See application file for complete search history.

(56) References Cited

U.S. PATENT DOCUMENTS

| | | | |
|---|---|---|---|
| 8,051,362 B2 | 11/2011 | Li et al. | |
| 9,397,985 B1 | 7/2016 | Seger, II et al. | |
| 9,608,829 B2 | 3/2017 | Spanos et al. | |
| 9,785,369 B1 | 10/2017 | Ateniese et al. | |
| 9,794,074 B2 | 10/2017 | Toll et al. | |
| 9,847,994 B1 | 12/2017 | Kelly et al. | |
| 9,870,508 B1 | 1/2018 | Hodgson et al. | |
| 9,881,176 B2 | 1/2018 | Goldfarb et al. | |
| 9,906,513 B2 | 2/2018 | Wuehler | |
| 9,942,231 B1 | 4/2018 | Laucius et al. | |
| 9,948,467 B2 | 4/2018 | King | |
| 9,959,065 B2 | 5/2018 | Ateniese et al. | |
| 10,002,277 B1 | 6/2018 | Endress et al. | |
| 10,002,362 B1 | 6/2018 | Endress et al. | |
| 10,026,118 B2 | 7/2018 | Castinado et al. | |
| 10,193,695 B1 | 1/2019 | Endress et al. | |
| 10,298,395 B1 | 5/2019 | Schiatti et al. | |
| 10,438,290 B1 | 10/2019 | Winklevoss et al. | |
| 10,505,726 B1 | 12/2019 | Andon et al. | |
| 10,521,780 B1 | 12/2019 | Hopkins, III et al. | |
| 10,540,654 B1* | 1/2020 | James | G06Q 20/223 |
| 10,721,069 B2 | 7/2020 | Konda et al. | |
| 11,206,138 B2 | 12/2021 | Canterbury et al. | |
| 11,216,772 B2 | 1/2022 | Blackburn et al. | |
| 11,232,439 B2 | 1/2022 | Westland | |
| 11,316,691 B2 | 4/2022 | Westland | |
| 11,348,099 B2 | 5/2022 | Vijayan | |
| 11,368,307 B1 | 6/2022 | Ozarkar et al. | |
| 11,481,841 B2 | 10/2022 | Robotham | |
| 11,528,141 B2 | 12/2022 | Konda et al. | |
| 11,574,308 B2 | 2/2023 | Robotham et al. | |
| 11,652,605 B2 | 5/2023 | Turner et al. | |
| 11,783,333 B2 | 10/2023 | Robotham et al. | |
| 11,972,420 B2 | 4/2024 | Westland | |
| 12,169,869 B2 | 12/2024 | Robotham | |
| 12,229,286 B2 | 2/2025 | Doney | |
| 2002/0143598 A1 | 10/2002 | Scheer | |
| 2005/0177435 A1 | 8/2005 | Lidow | |
| 2008/0313241 A1 | 12/2008 | Li et al. | |
| 2009/0204517 A1 | 8/2009 | Edens et al. | |
| 2011/0246779 A1 | 10/2011 | Teranishi | |
| 2012/0108446 A1 | 5/2012 | Wu et al. | |
| 2014/0109245 A1 | 4/2014 | Pestell | |
| 2014/0358745 A1 | 12/2014 | Lunan | |
| 2014/0359289 A1 | 12/2014 | Camenisch et al. | |
| 2015/0018406 A1 | 1/2015 | Glimcher et al. | |
| 2015/0356523 A1 | 12/2015 | Madden | |
| 2016/0260169 A1 | 9/2016 | Arnold et al. | |
| 2016/0358165 A1 | 12/2016 | Maxwell | |
| 2017/0091750 A1 | 3/2017 | Maim | |
| 2017/0278100 A1 | 9/2017 | Kraemer et al. | |
| 2017/0293503 A1 | 10/2017 | Curtis | |
| 2017/0300961 A1 | 10/2017 | Khvostov et al. | |
| 2017/0301047 A1 | 10/2017 | Brown et al. | |
| 2017/0316162 A1 | 11/2017 | Wall Warner et al. | |
| 2017/0346639 A1 | 11/2017 | Muftic | |
| 2018/0005186 A1 | 1/2018 | Hunn | |
| 2018/0048461 A1 | 2/2018 | Jutla et al. | |
| 2018/0082043 A1 | 3/2018 | Witchey et al. | |
| 2018/0101701 A1 | 4/2018 | Barinov et al. | |
| 2018/0139043 A1 | 5/2018 | Jayachandran et al. | |
| 2018/0165131 A1 | 6/2018 | O'Hare et al. | |
| 2018/0173378 A1 | 6/2018 | Tinari et al. | |
| 2018/0174097 A1 | 6/2018 | Liu et al. | |
| 2018/0189753 A1 | 7/2018 | Konda et al. | |
| 2018/0218176 A1 | 8/2018 | Voorhees et al. | |
| 2018/0218469 A1 | 8/2018 | Lert, Jr. et al. | |
| 2018/0237863 A1 | 8/2018 | Namsaraev et al. | |
| 2018/0331832 A1 | 11/2018 | Pulsifer | |
| 2019/0007381 A1 | 1/2019 | Isaacson et al. | |
| 2019/0012662 A1 | 1/2019 | Krellenstein et al. | |
| 2019/0034923 A1 | 1/2019 | Greco et al. | |
| 2019/0044714 A1 | 2/2019 | Parker et al. | |
| 2019/0080407 A1 | 3/2019 | Molinari et al. | |
| 2019/0108482 A1 | 4/2019 | Vikas et al. | |
| 2019/0130484 A1 | 5/2019 | De Jong | |
| 2019/0130701 A1 | 5/2019 | Simons | |
| 2019/0164151 A1 | 5/2019 | Doney et al. | |
| 2019/0164153 A1 | 5/2019 | Agrawal et al. | |
| 2019/0164223 A1 | 5/2019 | De Jong | |
| 2019/0188706 A1 | 6/2019 | McCurtis | |
| 2019/0266577 A1 | 8/2019 | Baldet et al. | |
| 2019/0279204 A1 | 9/2019 | Norton et al. | |
| 2019/0295049 A1 | 9/2019 | Karame et al. | |
| 2019/0299105 A1 | 10/2019 | Knight et al. | |
| 2019/0312869 A1 | 10/2019 | Han et al. | |
| 2019/0319798 A1 | 10/2019 | Chalkias | |
| 2019/0340269 A1 | 11/2019 | Biernat et al. | |
| 2019/0340619 A1 | 11/2019 | Leong et al. | |
| 2019/0347627 A1 | 11/2019 | Lin et al. | |
| 2019/0385120 A1 | 12/2019 | Yund et al. | |
| 2019/0385156 A1 | 12/2019 | Liu | |
| 2020/0005284 A1* | 1/2020 | Vijayan | G06Q 20/065 |
| 2020/0034788 A1 | 1/2020 | Ynion, Jr. | |
| 2020/0034834 A1 | 1/2020 | Li et al. | |
| 2020/0042913 A1 | 2/2020 | Kumar et al. | |
| 2020/0051043 A1* | 2/2020 | Wilson | G06Q 20/367 |
| 2020/0059361 A1 | 2/2020 | Konda et al. | |
| 2020/0059362 A1 | 2/2020 | Brody et al. | |
| 2020/0059364 A1 | 2/2020 | Konda et al. | |
| 2020/0065380 A1 | 2/2020 | Kartoun et al. | |
| 2020/0065761 A1 | 2/2020 | Tatchell | |
| 2020/0082336 A1 | 3/2020 | Vuppala et al. | |
| 2020/0111068 A1 | 4/2020 | Scarselli | |
| 2020/0174990 A1 | 6/2020 | Pratkanis | |
| 2020/0175465 A1 | 6/2020 | Abuhab | |
| 2020/0226741 A1 | 7/2020 | Correia Villa Real et al. | |
| 2020/0235943 A1 | 7/2020 | Salimi et al. | |
| 2020/0294128 A1 | 9/2020 | Cella | |
| 2020/0320529 A1 | 10/2020 | Lyadvinsky et al. | |
| 2020/0322154 A1 | 10/2020 | Konda et al. | |
| 2020/0327473 A1 | 10/2020 | Zur et al. | |
| 2020/0328891 A1 | 10/2020 | Drouot | |
| 2020/0328893 A1 | 10/2020 | Westland | |
| 2020/0351093 A1 | 11/2020 | Madhuram et al. | |
| 2020/0351094 A1 | 11/2020 | Canterbury et al. | |
| 2020/0410439 A1 | 12/2020 | Blackburn et al. | |
| 2021/0004739 A1 | 1/2021 | Gill et al. | |
| 2021/0042746 A1 | 2/2021 | Westland | |
| 2021/0119807 A1* | 4/2021 | Chen | H04L 9/3242 |
| 2021/0150626 A1 | 5/2021 | Robotham | |
| 2021/0157947 A1 | 5/2021 | Biazetti et al. | |

(56)  References Cited

U.S. PATENT DOCUMENTS

| | | | |
|---|---|---|---|
| 2021/0203488 A1 | 7/2021 | Stahl | |
| 2021/0248594 A1* | 8/2021 | Yantis | G06Q 20/389 |
| 2021/0264444 A1 | 8/2021 | Chen et al. | |
| 2021/0326872 A1 | 10/2021 | Robotham et al. | |
| 2022/0108310 A1 | 4/2022 | Westland | |
| 2022/0188810 A1 | 6/2022 | Doney | |
| 2022/0197894 A1 | 6/2022 | Brody et al. | |
| 2022/0271915 A1 | 8/2022 | Turner et al. | |
| 2023/0045669 A1 | 2/2023 | Robotham | |
| 2023/0153812 A1 | 5/2023 | Robotham et al. | |

FOREIGN PATENT DOCUMENTS

| | | | |
|---|---|---|---|
| CN | 109074566 A | 12/2018 | |
| CN | 110033377 A | 7/2019 | |
| EP | 3646563 A1 | 5/2020 | |
| EP | 4062585 B1 | 10/2025 | |
| JP | 2020140400 A | 9/2020 | |
| JP | 2020201564 A | 12/2020 | |
| WO | WO-2017187395 A1 | 11/2017 | |
| WO | WO-2017198891 A1 | 11/2017 | |
| WO | WO-2018007828 A2 | 1/2018 | |
| WO | WO-2018028777 A1 | 2/2018 | |
| WO | WO-2018144302 A1 | 8/2018 | |
| WO | WO-2018150275 A2 | 8/2018 | |
| WO | WO-2018163044 A1 | 9/2018 | |
| WO | WO-2018209153 A1 | 11/2018 | |
| WO | WO-2020041069 A1 | 2/2020 | |
| WO | WO-2020212420 A1 | 10/2020 | |
| WO | WO-2020214598 A1 | 10/2020 | |
| WO | WO-2020222862 A1 | 11/2020 | |
| WO | WO-2020263607 A1 | 12/2020 | |
| WO | WO-2021028363 A1 | 2/2021 | |
| WO | WO-2021034603 A1 | 2/2021 | |
| WO | WO-2021061044 A1 | 4/2021 | |
| WO | WO-2021102116 A1 | 5/2021 | |
| WO | WO-2021211814 A1 | 10/2021 | |

OTHER PUBLICATIONS

Ben-Sasson, E. et al., "Scalable, transparent, and post-quantum secure computational integrity," Cryptology ePrint Archive, Report 2018/046 (2018), 83 pages.
"Composable NFTs," FLR Finance, 2023, 4 pages, "title=" Link: https://flrfinance.medium.com/composable-nfts-db81238bfe52>>https://flrfinance.medium.com/composable-nfts-db81238bfe52.
Composable Token_Alexandria (Year: 2023), 3 pages.
Elmasri, R. et al., "Fundamentals of database systems," Seventh Edition, Pearson, 2016, 1273 pages.
Entriken, W. et al., "EIP-721: Non-Fungible Token Standard," Ethereum Improvement Proposals, Jan. 24, 2018, 14 pages.
ERC-20 Token Standard, 2020, 6 pages.
European Commission, "Code of Conduct on Withholding Tax," [Online], Ref. Ares(2017)5654449—Nov. 20, 2017, Retrieved from the Internet: https://ec.europa.eu/taxation_customs/sites/taxation/files/code_of_conduct_on_witholding_tax.pdf, 12 pages.
European Commission, "Non-paper on the withholding tax for discussion at the Expert Group on barriers to free movement of capital," Sep. 28, 2016, https://ec.europa.eu/transparency/regexpert/index.cfm?do=groupDetail.groupDetailDoc&id=28783&no=6 (last accessed Mar. 17, 2021), 6 pages.
European Parliament, Press Release, "Cum-ex tax fraud scandal: MEPs call for inquiry, justice, and stronger tax authorities," [Online], Nov. 29, 2018, Retrieved from the Internet: https://www.europarl.europa.eu/news/en/press-room/20181120IPR19552/cum-ex-tax-fraud-meps-call-for-inquiry-justice-and-stronger-tax-authorities, 4 pages.
European Parliament Resolution of Nov. 29, 2018 on the cum-ex scandal: financial crime and loopholes in the current legal framework (2018/2900(RSP), [Online], Retrieved from the Internet: http://www.europarl.europa.eu/doceo/document/TA-8-2018-0475_EN.html, May 19, 2020, 3 pages.

EY Global, "Transforming the business lifecycle with Nightfall," YouTube, Oct. 24, 2019, 3 pages.
"Fungible vs nonfungible tokens: What is the difference?" Cointelegraph, 2023, 5 pages, retrieved online https://cointelegraph.com/nonfungible-tokens-for-beginners/fungible-vs-nonfungible-tokens-what-is-the-difference#:~:text=The%20main%20difference%20between%20fungible,academic%20title%20or%20an%20artwork.
Groth, J. et al., "Snarky signatures: Minimal signatures of knowledge from simulation-extractable SNARKs," In: Katz, J., Shacham, H. (eds.) Crypto 2017. LNCS, vol. 10402, pp. 581-612.
International Search Report and Written Opinion for International Application No. PCT/EP2020/060588, mailed Jun. 24, 2020, 13 pages.
International Search Report and Written Opinion for International Application No. PCT/EP2020/072325, mailed Nov. 6, 2020, 11 pages.
International Search Report and Written Opinion for International Application No. PCT/US2019/046532, mailed Dec. 2, 2019, 10 pages.
International Search Report and Written Opinion for International Application No. PCT/US2019/046808, mailed Dec. 2, 2019, 9 pages.
International Search Report and Written Opinion for International Application No. PCT/US2019/056646, mailed Jan. 15, 2020, 11 pages.
International Search Report and Written Opinion for International Application No. PCT/US2019/057246, mailed Feb. 4, 2020, 8 pages.
International Search Report and Written Opinion for International Application No. PCT/US2019/057262, mailed Jan. 24, 2020, 9 pages.
International Search Report and Written Opinion for International Application No. PCT/US2020/061243, mailed Feb. 22, 2021, 12 pages.
International Search Report and Written Opinion for International Application No. PCT/US2021/027448, mailed Jul. 23, 2021, 11 pages.
International Search Report and Written Opinion for International Application No. PCT/US2020/028128, mailed Jun. 25, 2020, 9 pages.
International Telecommunication Union, Telecommunication Standardization Sector, Focus Group on Application of Distributed Ledger Technology, DLT-O-067, Output Document, "Updated baseline text: D4.1—DLT regulatory framework," Apr. 2019, 45 pages.
ISO 20022, "A single standardisation approach (methodology, process, repository) to be used by all financial standards initiatives," May 2013, [Online], Retrieved from the Internet: https://www.iso20022.org/, 6 pages.
ISO 6166—ISIN—International Securities Identification Number, [Online], Retrieved from the Internet: https://www.isin.net/iso-6166/, last updated Jul. 1, 2024, Retrieved from the Internet: May 2, 2021, 9 pages.
ISO 6166:2013, "Securities and related financial instruments International securities identification numbering system (ISIN)," Jul. 2013, [Online], Retrieved from the Internet: https://www.iso.org/standard/44811.html, 3 pages.
Kim, H., et al., "Perpetual Contract NFT as Collateral for DeFi Composability," IEEE Access, 2022, vol. 4, 8 pages.
Konda, C., "Introduction to EY Nightfall—How does it make token transactions private?", Jun. 10, 2019, 12 pages.
Kosba, A. et al., "Hawk: The Blockchain Model of Cryptography and Privacy-Preserving Smart Contracts," 2016 IEEE Symposium on Security and Privacy, May 2016, pp. 839-858.
Kyle, L., "Overview of EY Nightfall," Jun. 13, 2019, [Online], Retrieved from the Internet: https://medium.com/coinmonks/overview-of-ey-nightfall-f9e9ce21cf65, 11 pages.
Lee, C. H. et al., "Implementation of IoT system using blockchain with authentication and data protection," 2018 International Conference on Information Networking (ICOIN), IEEE, Jan. 10, 2018, pp. 936-940.
Lielacher, A., "Ernst & Young Rolls Out 'Nightfall' to enable private transactions on Ethereum," Brave New Coin, Jun. 7, 2019,

(56) References Cited

OTHER PUBLICATIONS

[Online], Retrieved from the Internet: https://bravenewcoin.com/ insights/ernst-and-young-rolls-out-'nightfall-to-enable-private-transactions-on, 6 pages.

Lockyer, M., "EIP-998: ERC-998 Composable Non-Fungible Tokenstandard [Draft]," Ethereum Improvement Proposals, No. 998, Jul. 2018, 35 pages. [Online serial], Available: https://eips. ethereum.org/EIPS/eip-998.

Lockyer, Matt, "Introducing Crypto Compsoables," Medium, Apr. 14, 2018, 7 pages, "title="Link: https://medium.com/coinmonks/ introducing-crypto-composables-ee5701fde217>>https://medium. com/coinmonks/introducing-crypto-composables-ee5701fde217.

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Nightfall, 2019, 16 pages.

Nitulescu, A., "zk-SNARKs: A Gentle Introduction," 2022, 49 pages.

OECD (2017), "Commentary on Article 10 Concerning The Taxation on Dividends," In Model Tax Convention on Income and on Capital: Condensed Version 2017, OECD Publishing, Paris, [Online], Retrieved from the Internet: https://read.oecd-ilibrary.org/taxation/ model-tax-convention-on-income-and-on-capital-condensed-version-2017_mtc_cond-2017-en, pp. 231-253.

OECD (2020), Centre for Tax Policy and Administration, Glossary of Tax Terms, "Withholding Tax," [Online], Retrieved from the Internet: https://www.oecd.org/ctp/glossaryoftaxterms.htm., 23 pages.

OECD (2020), "Trace XML Schema: User Guide," OECD, Paris [Online], Retrieved from the Internet: http://www.oecd.org/tax/ exchange-of-tax-information/trace-XML-schema-user-guide.htm, 70 pages.

OECD, "Action 13 Country-by-Country Reporting," [Online], Retrieved from the Internet: https://www.oecd.org/tax/beps/beps-actions/ action13/, 7 pages.

OECD, Common Reporting Standard (CRS)—Organisation for Economic Co-operation and Development, "What is the CRS?" Jul. 15, 2014, [Online], Retrieved from the Internet: https://www.oecd. org/tax/automatic-exchange/common-reporting-standard/, 3 pages.

OECD, "Trace Implementation Package," Jan. 23, 2013, [Online], Retrieved from the Internet: https://www.oecd.org/ctp/exchange-of-tax-information/TRACE_Implementation_Package_Website.pdf, 135 pages.

Office Action and Search Report for Chinese Application No. CN202080081078.4 mailed Jun. 28, 2024, 14 pages.

Office Action for U.S. Appl. No. 16/283,452, mailed Jul. 10, 2019, 31 pages.

Office Action for U.S. Appl. No. 16/283,452, mailed Nov. 6, 2019, 34 pages.

Office Action for U.S. Appl. No. 16/848,269, mailed Sep. 8, 2021, 22 pages.

Office Action for U.S. Appl. No. 16/848,506, mailed Sep. 13, 2021, 8 pages.

Office Action for U.S. Appl. No. 16/869,944, mailed Dec. 3, 2020, 24 pages.

Office Action for U.S. Appl. No. 16/869,944, mailed May 21, 2021, 22 pages.

Office Action for U.S. Appl. No. 16/904,296, mailed Apr. 5, 2022, 33 pages.

Office Action for U.S. Appl. No. 16/904,296, mailed Jun. 10, 2021, 27 pages.

Office Action for U.S. Appl. No. 16/904,296, mailed Oct. 21, 2021, 31 pages.

Office Action for U.S. Appl. No. 16/952,949, mailed Jun. 15, 2021, 23 pages.

Office Action for U.S. Appl. No. 16/952,949, mailed Sep. 30, 2021, 25 pages.

Office Action for U.S. Appl. No. 17/231,467, mailed Feb. 16, 2022, 29 pages.

Office Action for U.S. Appl. No. 17/231,467, mailed Oct. 1, 2021,34 pages.

Olsson, Oskar, "A Taxonomy of Non-Fungible Tokens, " Uppsala University Department of Informatics and Media, Thesis Defense, 2022, 47 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Parno, B. et al., "Pinocchio: Nearly practical verifiable computation," S&P (2013), 16 pages.

Planta, F., European Securities and Markets Authority (esma), European Parliament—FISC Sub Committee on Fiscal Matters, Public hearing on "Cum/Ex and Cum/Cum scandal," Feb. 22, 2021, ESMA70-155-11890, Retrieved from the Internet: https://www. esma.europa.eu/sites/default/files/library/esma70-155-11890_statement_ cumex_cumcum_scandal_-_fabrizio_planta.pdf, 3 pages.

Reiff, N., "What is ERC-20 and What Does it Mean for Ethereum?," Investopedia, Jan. 26, 2022, 8 pages.

Romano, Diego et al., "Beyond Bitcoin: Recent Trends and Perspectives in Distributed Ledger Technology," Cryptography, 2021, vol. 5, No. 36, pp. 1-45. >https://www.mdpi.com/2410-387X/5/4/ 36.

Sankaran, A., "EY launches the world's first secure private transactions over the Ethereum public blockchain," EY Press Release, EYGM Limited, Oct. 2018, London, GB, 4 pages (2018).

Shahid, A. et al., "Blockchain-based agri-food supply chain: A complete solution," IEEE Access, IEEE, vol. 8, Apr. 2020, pp. 69230-69243.

Wang, X. et al., "STAMP: Enabling Privacy-Preserving Location Proofs for Mobile Users," IEEE/ACM Transactions on Networking, vol. 24, No. 6, Dec. 2016, pp. 3276-3289.

Westerkamp, M., et al., "Blockchain-based supply chain traceability: Token recipes model manufacturing processes," 2018 IEEE Confs on Internet of Things, Green Computing and Communications, Cyber, Physical and Social Computing, Smart Data, Blockchain, Computer and Information Technology, Congress on Cybermatics, IEEE, Jul. 2018, pp. 1595-1602.

Wu, H., "DIZK: Distributed zero-knowledge proof systems," In USENIX Security (2018), 35 pages.

Zhang, Y. et al., "Z-Channel: Scalable and efficient scheme in zerocash," 2017, [Online], Retrieved from the Internet: https://eprint. iacr.org/2017/684, pp. 1-39.

AU Application No. 2020387408, Examination report No. 1 mailed Jul. 8, 2025; Applicant EYGS LLP; 3 pages.

AU Application No. 2020387408, Examination report No. 2 mailed Nov. 25, 2025; Applicant EYGS LLP; 3 pages.

Betti, Q. et al., "Smart Contracts-Enabled Simulation for Hyperconnected Logistics," Decentralised Internet of Things: A Blockchain Perspective; Studies in Big Data (SBD), (Feb. 13, 2020), vol. 71; 44 pages.

Blackline, "From cash to close, get a connected, auditable platform powered by Verity AI and trusted by CFOs," Blackline.com, first publication date unknown [online]. Retrieved on Dec. 19, 2025 from the Internet at URL: https://www.blackline.com/?gclid= CjwKCAjw1ZbaBRBUEiwA4VQClaJVYu5bfp-p44DZUBhk3ivK8hhjZFbEAy-6oyeFOhHz8vcBVJKFXxoC4NsQAvD_BwE&medium=cpc&utm_ medium=cpc; 7 pages.

CN Application No. CN202080081078.4, Notification of Grant mailed Sep. 13, 2024; Applicant EYGS LLP et al.; with English Translation; 8 pages.

E2open, "Global Trade Application Suite—Global Trade Management Software: Import and Export Efficiently with AI," E2open, Wisetech Global Group, first publication date unknown [online]. Retrieved on Dec. 21, 2025 from the Internet at URL: https://www. e2open.com/global-trade/; 5 pages.

EP Application No. 21724422.7, Examination Report mailed Apr. 17, 2025; Applicant EYGS LLP et al.; 6 pages.

Invictus, "Making blockchain real for business," Invictus.sg, first publication date unknown [online]. Retrieved on Dec. 19, 2025

(56)                    References Cited

OTHER PUBLICATIONS from Internet Archive Wayback Machine at URL: https://web. archive.org/web/20190220031754/ http://invictus.sg/, [captured on Feb. 20, 2019]; 10 pages.
Lesavre, L. et al., "A Taxonomic Approach to Understanding Emerging Blockchain Identity Management Systems," National Institute of Standards and Technology (NIST), (Jan. 14, 2020); 62 pages.
Maersk et al., "Tradelens Solution Brief: Edition Two," Maersk. com, first publication date unknown [online]. Retrieved on Jun. 21, 2019 from the Internet at URL: https://www.maersk.com/~/media_ sc9/maersk/local-information/files/west-central-asia/india/tradelens-solution-brief.pdf; 11 pages.
Managing International Customs & Trade Compliance (MIC), "Software Solutions and Services," Mic-cust.com, first publication date unknown [online]. Retrieved on Apr. 2, 2019 from the Internet at URL: https://www.mic-cust.com/; 13 pages.
MX Application No. MX/a/2022/012949, Office Action mailed Jun. 27, 2025; Applicant EYGS LLP; with English Translation; 9 pages.
Oracle, "Oracle Global Trade Management Cloud: Streamline Global Trade Networks with a Modern Supply Chain Solution for Customs, Logistics, and Cross-Border Compliance," oracle.com/scm, first publication date unknown [online]. Retrieved on Jun. 15, 2016 from the Internet at URL: oracle.com/scm; 2 pages.
SAP, "Run Worldwide with SAP Global Trade Services," Sap.com, first publication date unknown [online]. Retrieved on Mar. 25, 2020 from the Internet at URL: https://learning.sap.com/products/supply-chain-management/global-trade-services; 17 pages.
SG Application No. 11202205178P, Notice of Eligibility and Examination Report mailed Mar. 20, 2025; Applicant EYGS LLP; 4 pages.
SG Application No. 11202254087V, Notice of Eligibility and Examination Report mailed Jun. 19, 2025; Applicant EYGS LLP et al.; 4 pages.
Thomson Reuters, "Onesource Free Trade Agreement Management," Thomsonreuters.com, first publication date unknown [online]. Retrieved on Jul. 18, 2019 from the Internet at URL: https://tax. thomsonreuters.com/en/international-trade-supply-chain/global-trade-compliance-management; 2 pages.
U.S. Appl. No. 17/966,443, Final Office Action mailed Aug. 21, 2023; Inventor Robotham, John Stoddard; 15 pages.
U.S. Appl. No. 17/966,443, Non Final Office Action mailed Jan. 13, 2023; Inventor Robotham, John Stoddard; 25 pages.
U.S. Appl. No. 17/966,443, Non Final Office Action mailed Mar. 4, 2024; Inventor Robotham, John Stoddard; 25 pages.
U.S. Appl. No. 17/966,443, Notice of Allowance mailed Jul. 31, 2024; Inventor Robotham, John Stoddard; 19 pages.
Zhang, W. et al., "Blockchain/DLT: A game-changer in managing MNCs intercompany transactions," IBM Research, (Nov. 2017); 9 pages.
IN Application No. 202217024269, Office Action mailed Feb. 9, 2026, Applicant: EYGS LLP., 7 pages. [English Translation included].
MX Application No. MX/a/2022/012949, Office Action mailed Dec. 17, 2025, Applicant: EYGS LLP, 14 pages. [English translation included], 16 pages.

* cited by examiner

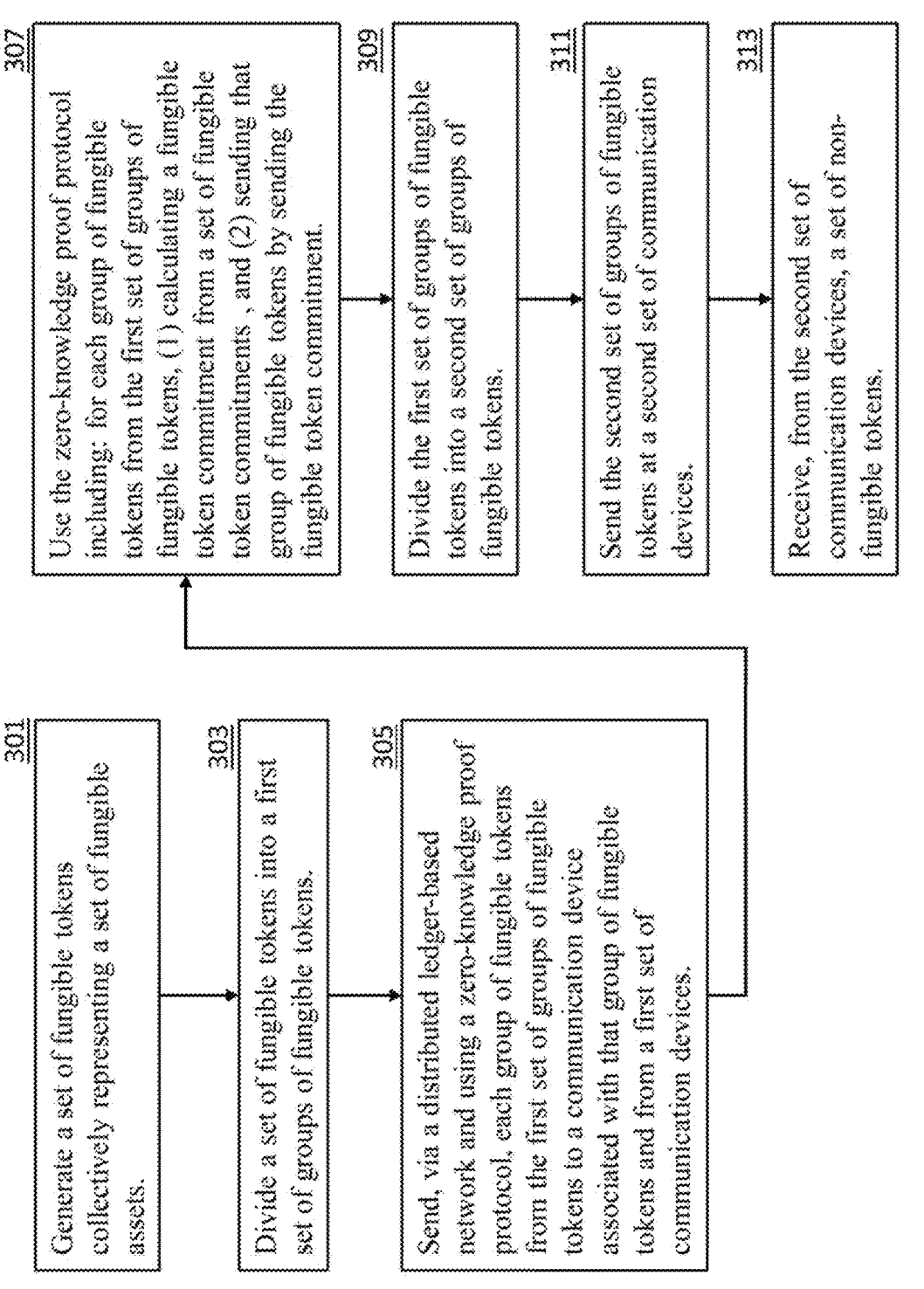

301

Generate a set of fungible tokens collectively representing a set of fungible assets.

303

Divide a set of fungible tokens into a first set of groups of fungible tokens.

305

Send, via a distributed ledger-based network and using a zero-knowledge proof protocol, each group of fungible tokens from the first set of groups of fungible tokens to a communication device associated with that group of fungible tokens and from a first set of communication devices.

307

Use the zero-knowledge proof protocol including: for each group of fungible tokens from the first set of groups of fungible tokens, (1) calculating a fungible token commitment from a set of fungible token commitments , and (2) sending that group of fungible tokens by sending the fungible token commitment.

309

Divide the first set of groups of fungible tokens into a second set of groups of fungible tokens.

311

Send the second set of groups of fungible tokens at a second set of communication devices.

313

Receive, from the second set of communication devices, a set of non-fungible tokens.

FIG. 3

SYSTEMS, APPARATUS AND METHODS FOR IDENTIFYING AND SECURELY STORING DISTINGUISHING CHARACTERISTICS IN A DISTRIBUTED LEDGER WITHIN A DISTRIBUTED LEDGER-BASED NETWORK BASED ON FUNGIBLE AND NON-FUNGIBLE TOKENS

CROSS-REFERENCE TO RELATED APPLICATION

This application is a division of U.S. patent application Ser. No. 17/966,443, now U.S. Pat. No. 12,169,869, filed Oct. 14, 2022, which is a division of U.S. patent application Ser. No. 16/952,949, now U.S. Pat. No. 11,481,841, filed Nov. 19, 2020 and titled "Systems, Apparatus And Methods For Identifying And Securely Storing Distinguishing Characteristics In A Distributed Ledger Within A Distributed Ledger-Based Network Based On Fungible And Non-Fungible Tokens," which claims priority under 35 U.S.C. § 119 to U.S. provisional application Ser. No. 62/938,210, filed on Nov. 20, 2019, and entitled "Methods and Systems for Identifying Distinguishing Characteristics of Fungible Assets on Distributed Ledger-Based Networks," the contents of which are incorporated herein by reference in their entireties.

BACKGROUND

Some embodiments described herein relate generally to translating data structures of distributed ledger-based networks. In particular, but not by way of limitation, some embodiments described herein relate to systems, apparatus and methods for identifying and storing distinguishing characteristics in a distributed ledger within a distributed ledger-based network based on fungible and non-fungible tokens.

A distributed ledger is a consensus of replicated and synchronized data geographically shared across multiple nodes on a network. Without using a centralized data storage, each distributed ledger database replicates and saves an identical copy of the ledger. A distributed ledger may employ executing codes, also known as smart contracts, to manage transactions and store records of transactions among disparate participants in the distributed ledger-based network (DLN) without the need for a central authority. This transparency, however, can reduce or even eliminate any privacy or confidentiality that participants need or seek when interacting with the DLN or its participants.

Accordingly, a need exists for a distributed ledger-based network that provides a decentralized and transparent platform to facilitate transactions between participants and protect privacy or confidentiality that the participants need.

SUMMARY

In some embodiments, a method includes storing data associated with a set of proportions of assets from a set of fungible assets in a first instance of distributed ledger database at a transaction originating communication device. The method includes dividing, at a processor of the transaction originating communication device, a set of fungible tokens into a first set of groups of fungible tokens based on the data. Each proportion of assets from the set of proportions of assets is associated with a communication device from a first set of communication devices. The set of fungible tokens collectively represents the set of fungible assets on a distributed ledger-based network. The method includes sending, via the distributed ledger-based network and based at least in part on an asymmetric cryptography key pair, each group of fungible tokens from the first set of groups of fungible tokens to a communication device (1) associated with that group of fungible tokens and (2) from the first set of communication devices to cause the second plurality of communication devices to send, to a designated recipient communication device, a set of non-fungible tokens for each group of fungible tokens from the second set of groups of fungible tokens. The first set of groups of fungible tokens is divided into a second set of groups of fungible tokens and received at a second set of communication devices that is at a different hierarchical level in an order of data transmission than the first set of communication devices. Each non-fungible token from the set of non-fungible tokens is non-divisible and associated with an identifier (1) uniquely identifying a transaction destination from a set of transaction destinations and (2) from a set of identifiers, the second set of communication devices not including the transaction originating communication device.

BRIEF DESCRIPTION OF THE FIGURES

FIG. 3 shows a flow chart illustrating a method of establishing chains of custody of assets in a network of cascading communication devices in the DLN, according to some embodiments.

DETAILED DESCRIPTION

Figure 1:
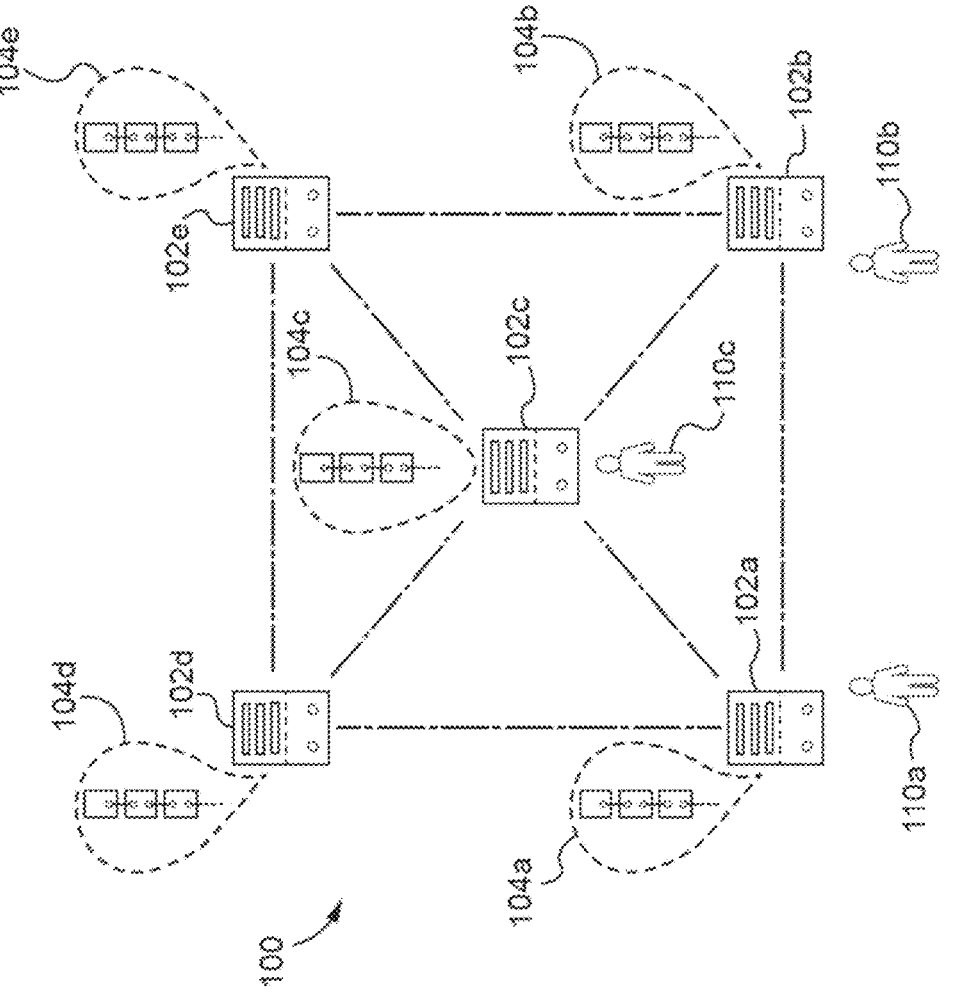
FIG. 1 shows a distributed ledger-based networks (DLN) configured for use in establishing chains of custody of assets in a network of cascading communication devices in the DLN, and uncovering or identifying distinguishing characteristics of said assets, where the assets are represented on the DLN via tokens, according to some embodiments.

In some embodiments, parties participating in a transaction may elect to use a public or a private (permissioned) distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction (e.g., on the DLN or off-the DLN) involving assets can represent the assets on the DLN (e.g., a blockchain) via tokens and manage the transaction on the DLN using a self-executing code segment or program (e.g., a smart contract) on the DLN.

In some embodiments, distinguishable assets can be represented with non-fungible tokens while indistinguishable assets can be represented with fungible tokens. Examples of such assets include financial instruments (e.g., dividends, interest payments, capital gains, etc.), digital assets (e.g., coins), physical objects, and/or the like. In some implementations, fungible tokens represent assets that are interchangeable or indistinguishable. Fungible tokens can be of the same type and can be aggregated and/or divided. Examples of fungible tokens include, but are not limited to, an amount of a financial instrument, currency, shares, screws, reams of paper, and/or the like. Non-fungible tokens represent assets that are uniquely identifiable or distinguishable. Non-fungible tokens may not be partitioned and combined to increase or decrease the "amount" of the non-fungible tokens. Non-fungible tokens can have unique identifiers or serial numbers. In some examples, non-fungible tokens allow tracking of individual assets and tracking at the level of an individual asset can use more storage and computation than using fungible tokens that represent a set or collection of assets. Examples of non-fungible tokens include, but are not limited to, tokens that identify the ownerships of assets, a car's vehicle identification number (VIN), property deed, a tracking number of a shipment, and/or the like.

In some embodiments, the fungible tokens can either represent the assets or the entitlements to assets (rather than the assets themselves). Assets and entitlements to assets can be used interchangeably throughout the description herein. In some examples, the fungible tokens represent the assets. In some examples, the fungible tokens represent the distribution and ownership of entitlements to the dividends (also referred to as "dividend entitlements"). In some examples, the fungible tokens represent "rights" or "entitlements" in the assets as opposed to directly representing the assets themselves. For example, a property title is not the property itself, it is the right to claim ownership of that property.

In some implementations, the self-executing code segment or smart contract can regulate the transaction between the parties by, among other things, verifying proofs that may be submitted by the transacting parties in relation to the transaction, as discussed below. In some implementations, records of secure transactions on the DLN can be used to establish chains of custody in a network of communication devices (operated by a set of entities) on the DLN for assets represented on the DLN via tokens. In some implementations, the information of any communication device that interacts with a fungible token can be recorded in the chain of custody of that fungible token. In other words, when a fungible token is transferred from a sending communication device to a receiving communication device, the identifiers of the sending communication device to the receiving communication device can be recorded in the distributed ledger database of the distributed ledger network (DLN). Thus, the chain of custody via the DLN provides integrity, traceability, authentication, verifiability and security of token transfers for participating and non-participating parties on the DLN.

In some embodiments, a DLN can be and/or support a blockchain. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, the term "transaction" may be used to refer to interactions on the DLN between DLN participants involving assets. The interactions or transactions include establishing chains of custody of the assets by tracing the division and distribution to the entities of fungible tokens representing the assets as well as identifying the distinguishing characteristics of the assets via the generation of non-fungible tokens to represent the same assets (e.g., via the generation of tokens that include uniquely identifying characteristics of the assets). The terms "off-chain" or "off-the DLN" are to be understood to mean "not on the blockchain network" or "not on the DLN." For example, a statement such as "the data is stored off-the DLN" is to be understood to refer to the statement of "the data not being stored on the storage system(s) of, or not being controlled by, the DLN (and is instead stored at or controlled by systems elsewhere, i.e., on a storage system that is not on the DLN.)" Embodiments described herein can take place, for example, in either a public DLN or a private (permissioned) DLN.

In some embodiments, the trust that distributed ledger-based networks provide without a need for a central authority derives from the transparency of the networks to at least all the participants of a network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information (including, for example, details of confidential financial transactions) on all transactions that are represented on the ledgers since the inception of the networks (as the ledgers are, in at least most cases, largely immutable). The same implications of transparent access to detailed information holds true among participants in a private or permissioned distributed ledger network.

Accordingly, one or more embodiments described herein operate with a distributed ledger-based network that provides a decentralized and trustworthy platform such that the embodiment(s) efficiently shares information through the network among the participants, while keeping distinguishing characteristics secure and private. In some implementations, smart contracts allow for the tokenization of the financial assets (e.g., dividend entitlements declared on the dividend event triggered by an originating financial intermediary such as a local custodian). Further, disclosed methods and systems automatically interact with intermediary communication devices to extract key information used to identify, for example, shareholdings at each successive level. The fungible tokens can be distributed via the DLN to multiple participants. Once the transaction destinations (e.g., owners (natural persons or institutions) of the fungible tokens) are identified, the smart contract allows the generation of non-fungible tokens based on the fungible tokens, providing to the recipient of a non-fungible token information used to calculate a value (e.g. withholding tax) assigned to that non-fungible token based on the subset of fungible tokens represented by that non-fungible token combined with additional information supplied by the non-fungible token (e.g., a treaty category, a country of residence, with encrypted access to investor's identity and Certificate of Residence (COR).) In some implementations, the correct amount of withholding tax can be determined on income from cross-border investments, eliminating the need for calculations at the transaction originating communication device and other intermediary communication devices. Such calculations include, for example, payment reconciliations at each level of the network of financial intermediaries. One or more embodiments described herein increase the accuracy of the calculations, reduce potential of fraud, and increase trust among all participants. One or more embodiments described herein also eliminate the need for lengthy and expensive reclaim processes when, for example, the withholding tax has been inaccurately calculated due to the lack of information and lack of trust within the existing system.

In some embodiments, the level of privacy and security available on DLNs (e.g., private or public DLNs) may be enhanced via the implementation of zero-knowledge proofs (ZKPs) in the DLNs. In some implementations, a ZKP-enabled DLN may provide at least increased level of privacy to transaction participants while still retaining the level of trust that is afforded by decentralized networks (i.e., with no central authority). For instance, a ZKP-enabled DLN (e.g., ZKP-enabled public DLN or blockchain) can be used to facilitate a transaction without revealing publicly or to other participants of the ZKP-enabled DLN details of the transaction such as but not limited to identities of the transacting parties, the assets being transferred as part of the transaction, the tokens representing the assets on the ZKP-enabled DLN (e.g., fungible or non-fungible tokens representing assets on the ZKP-enabled DLN), and/or the like.

In some embodiments, a method includes storing data associated with a set of proportions of assets from a set of fungible assets in a first instance of distributed ledger database at a transaction originating communication device. The method includes dividing, at a processor of the transaction originating communication device, a set of fungible tokens into a first set of groups of fungible tokens based on the data. Each proportion of assets from the set of proportions of assets is associated with a communication device from a first set of communication devices. The set of fungible tokens collectively represents the set of fungible assets and the representations can be stored on a distributed ledger-based network. The method includes sending, via the distributed ledger-based network and based at least in part on an asymmetric cryptography key pair, each group of fungible tokens from the first set of groups of fungible tokens to a communication device (1) associated with that group of fungible tokens and (2) from the first set of communication devices to cause the second plurality of communication devices to send, to a designated recipient communication device, a set of non-fungible tokens for each group of fungible tokens from the second set of groups of fungible tokens. The first set of groups of fungible tokens is divided into a second set of groups of fungible tokens and received at a second set of communication devices that is at a different hierarchical level in an order of data transmission than the first set of communication devices. Each non-fungible token from the set of non-fungible tokens is non-divisible and associated with an identifier (1) uniquely identifying a transaction destination from a set of transaction destinations and (2) from a set of identifiers, the second set of communication devices not including the transaction originating communication device.

As used herein, the singular forms "a," "an" and "the" include plural referents unless the context clearly dictates otherwise. Thus, for example, the term "a transaction destination" is intended to mean a single transaction destination or multiple transaction destinations. For another example, the term "a token" is intended to mean a single token or multiple tokens.

FIG. 1 shows a DLN configured for use in establishing chains of custody of assets in a network of cascading communication devices the DLN, and identifying distinguishing characteristics of said assets, where the assets are represented on the DLN via tokens, according to some embodiments. In some embodiments, the DLN 100 (e.g., Ethereum) includes a set of communication devices (or computing nodes) 102a-102e configured to communicate amongst each other via a peer-to-peer (P2P) connection. In some implementations, the communication devices 102a-102e can be computing devices including but not limited to computers, servers, processors, data/information processing machines or systems, and/or the like, and may include data storage systems such as databases, memories (volatile and/ or non-volatile), etc. In some implementations, the P2P connections may be provided by wired and/or wireless communications systems or networks (not shown) such as but not limited to the internet, intranet, local area networks (LANs), wide area networks (WANs), etc., utilizing wireless communication protocols or standards such as WiFi®, LTE®, WiMAX®, and/or the like. The DLN 100 can be a public DLN or a private (permissioned) DLN.

In some embodiments, the DLN 100 may include self-executing codes or smart contracts that are configured to execute upon fulfillment of conditions that are agreed upon between transacting parties (e.g., execute a transaction including the division and distribution of fungible tokens upon fulfillment of a condition such as but not limited to expiration of a deadline). For example, some or all of the communication devices 102a-102e may include copies of a self-executing code that self-execute upon fulfillment of the conditions. In some implementations, the communication devices 102a-102e may communicate amongst each other with the results of the executions of their respective self-executing codes, for example, to arrive at a consensus on the results. In some implementations, one or a few of the communication devices 102a-102e may have self-executing codes that self-execute, and the results would be transmitted to the rest of the communication devices 102a-102e for confirmation.

In some embodiments, a self-executing code or a smart contract can facilitate the transactions (or the transfer of tokens) on the DLN 100 by providing the transaction participants confidence in the integrity of the transaction. For example, a transaction between two communication devices involving an asset may include a ZKP proving a characteristic related to the asset without revealing an underlying information related to the characteristic. In such implementations, once the ZKP is verified by the self-executing code segment, the communication devices can have confidence in the integrity of the transaction (i.e., in the fact that the characteristic related to the asset is verified or accurate), even without having access to the underlying information. As an example illustration, the asset can be a financial instrument and a first communication device may wish to prove to a second communication device an assertion about the country of residency of the owner of the financial instrument (i.e., the asset characteristic) without having to reveal the identity of the asset (i.e., the underlying information). As such, the first transacting communication device may submit a ZKP to that effect to the self-executing code segment on the ZKP-enabled DLN 100. Upon verification of the ZKP by the self-executing code segment, the second communication device may have confidence in the accuracy of the verified assertion as a result of the verification of the proof by the self-executing code segment, thereby facilitating the transaction (or the transfer of the tokens) on the ZKP-enabled DLN 100.

In some embodiments, the DLN 100 may be linked to one or more oracles (not shown) or data feeds that provide external data to the DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on a deadline, the price of a stock, a weather condition, etc., and an oracle may provide the requisite information to the smart contract facilitating the transaction. The smart contract, upon receiving the information, may self-execute after determining that the condition for the transaction has been fulfilled. For example, a transaction between transacting parties 110a, 110b, 110c may involve the party 110a splitting a batch of financial instruments (e.g., dividends) into two and distributing the split portions to transacting parties 110b and 110c when a condition is met (e.g., the expiration of a deadline), and the smart contract may execute the transaction only when the oracle has received information that the condition is fulfilled (i.e., the deadline has expired).

In some embodiments, at least a substantial number of the communication devices 102a-102e (e.g., at least greater than 50%, 60%, 75%, 90%, including values and subranges therebetween, of the total number of communication devices 102a-102e that make up the DLN 100) include copies of a distributed ledger 104a-104e (or a distributed ledger, or an instance of the DLN) onto which transactions that occur on the network are recorded. In some implementations, the recording of the transactions on the distributed ledger 104a-104e may occur when some substantial number of the communication devices 102a-102e, or a subset thereof, agree on the validity of the transactions. The distributed ledger 104a-104e can be immutable or nearly immutable in the sense that to alter the distributed ledger 104a-104e, at least this substantial portion of the communication devices 102a-102e would have to agree, which can be increasingly difficult when the number of communication devices 102a-102e is large (and the distributed ledger 104a-104e gets longer).

In some embodiments, communication devices 102a-102e of the DLN 100 may transmit encrypted data messages (e.g., whisper messages) through private or shared communication channels where the messages are not recorded on the DLN (e.g., off the DLN). Blockchain transactions and events can be visible to all nodes. Zero Knowledge Proof (ZKP) method can obfuscate the wallet addresses (or the identifiers of the communication devices 102a-1023), but the transactions and events are "public". The Whisper messaging protocol is an example of a parallel mechanism that allows private encrypted communications. The secure messaging system described herein is not limited to the Whisper messaging protocol. In some implementations, messages can "broadcast" to all nodes but only the recipient(s) can decode the message with the correct key. Unlike transactions and events, the messages are not recorded on the DLN 100. In some implementations, after a transfer of fungible tokens or a non-fungible token, the communication device 102a-102e can use encrypted messages to send private notifications and the receiving communication device can then perform the next cascading action. In some implementations, some of the encrypted messages containing the private notifications are recorded on the DLN where only the intended recipient can decode the message with the correct decryption key (e.g., a private key included with a private-public encryption key pair).

In some implementations, encrypted messages are used in part to specify private communication channels (such as secure REST APIs) where additional private information associated with the token can be transferred out-of-DLN (or off-DLN). When secure messages are used in conjunction with out-of-DLN private communication channels, the private information associated with the fungible or non-fungible token can be partitioned between information sent via the secure message and information sent through the private communication channel (such as a secure REST APIs).

Figure 2A:
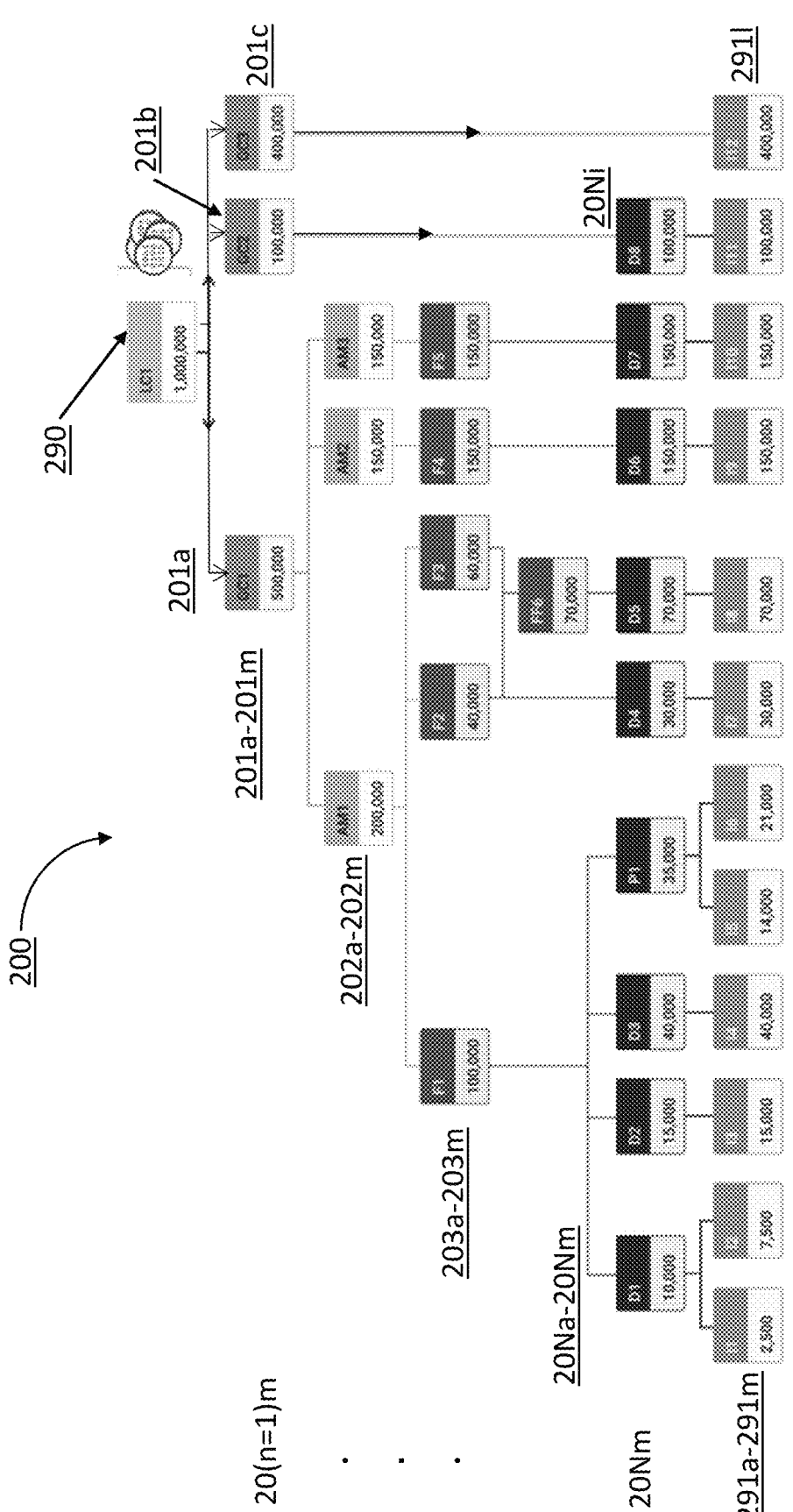
FIGS. 2A-2C show example sequential flowchart illustrating the establishment of chains of custody of assets in a network of cascading communication devices in the DLN, and the identification of distinguishing characteristics of said assets, where the assets are represented on the DLN via tokens, according to some embodiments.
Figure 2B:
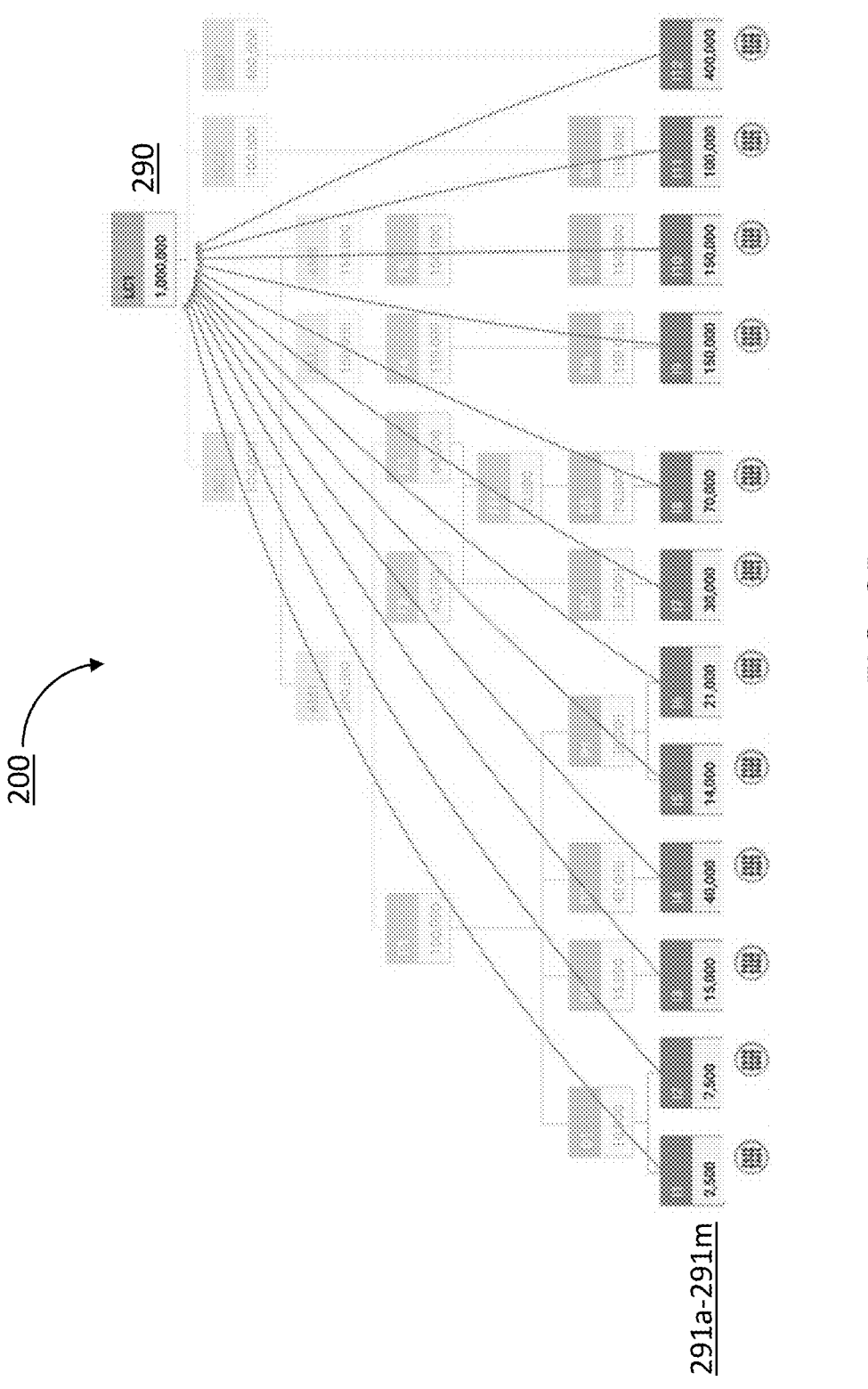
Figure 2C:
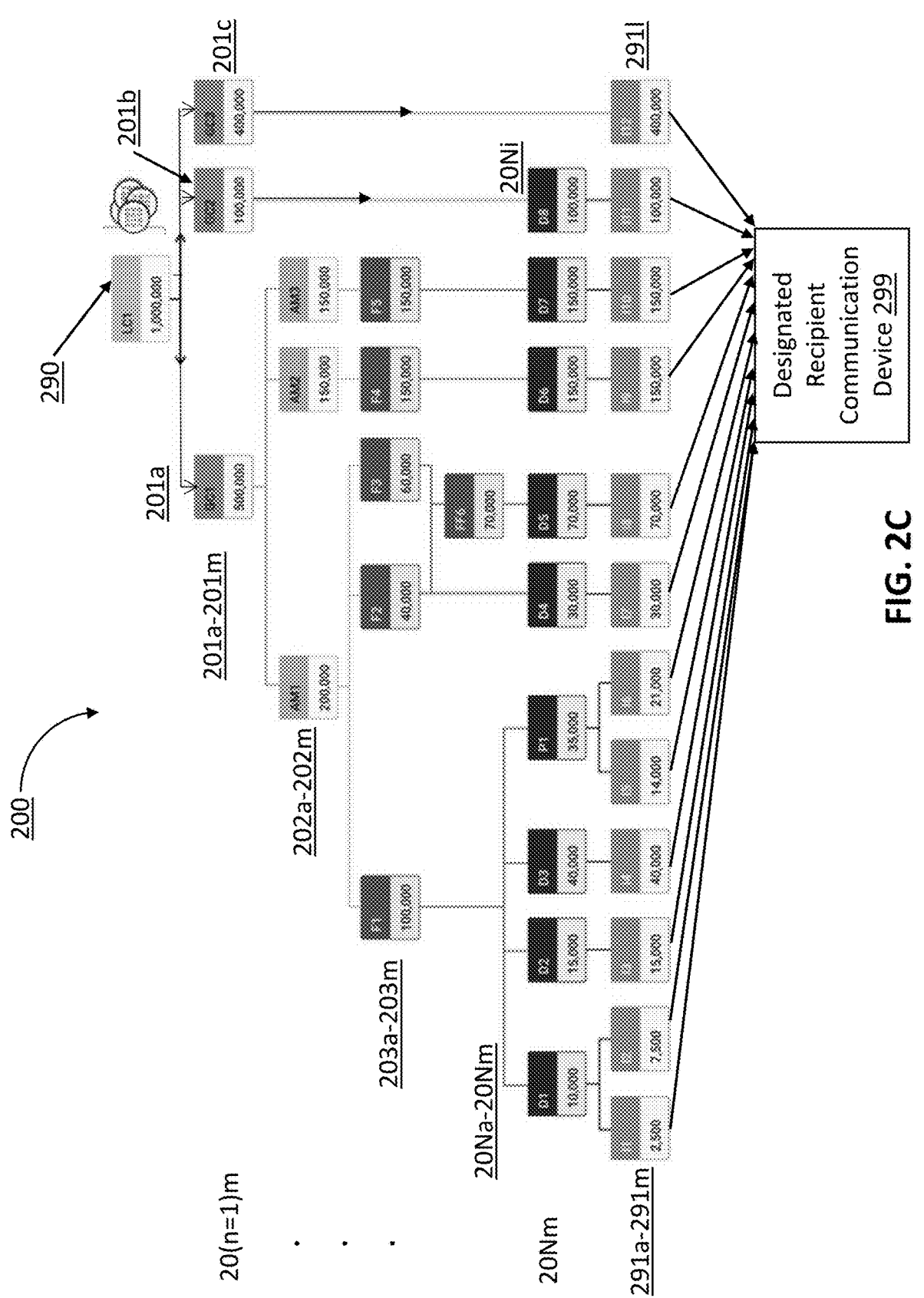

FIGS. 2A-2C show example sequential flowcharts illustrating the establishment of chains of custody of assets in the network of cascading communication devices in the distributed ledger-based network (DLN), and the identification of distinguishing characteristics of said assets, where the assets are represented on the DLN via tokens, according to some embodiments. The DLN 200 is similar to the DLN 100 described with regards to FIG. 1. A set of communication devices (or computing nodes) can be configured to communicate with each other via the DLN 200. The set of communication devices includes the transaction originating communication device 290, the transaction destination communication devices 291a-291m, and a set of cascading intermediate communication devices 20nm (where n=1, 2 . . . , N; m=1, 2 . . . , M, and N and M are finite natural numbers representing the number of layers in the cascading order and the number of entities within a layer, respectively.) The transaction destination communication devices 291a-291m can be operated by transaction destinations (or natural persons or ultimate entities of the fungible assets) (not shown in FIGS. 2A-2C).

The set of cascading intermediate communication devices 20nm are similar in physical structures and functionalities to the communication devices 102a-102e described with regards to FIG. 1. In some implementations, the set of cascading intermediate communication devices 20nm can be configured to communicate with each other via the peer-to-peer connection of the DLN 200. In these implementations, the set of cascading intermediate communication devices 20nm can spread across various geographical locations and are not necessarily hierarchical in network topology. The set of cascading intermediate communication devices 20nm can be hierarchical in an order of data transmission. Stated differently, the set of cascading intermediate communication devices 20nm can be at different levels in an order of data transmission. Such hierarchy of the set of cascading intermediate communication devices can be dynamic and change over time.

For example, the set of cascading intermediate communication devices 20nm can include a first plurality of communication devices 201a-201m, a second plurality of communication devices 202a-202m, and a third plurality of communication devices 20Na-20Nm. In some implementations, the transaction originating communication device 290 and the set of cascading intermediate communication devices 20nm can participate in the DLN 200. In some implementations, the transaction destination communication devices 291a-291m may or may not participate in the DLN 200.

In some implementations, the transaction originating communication device 290 may be in possession of assets that are associated with the transaction destinations (or ultimate entities), which operate the transaction destination communication devices 291a-291m. The transaction originating communication device 290, however, may not be in possession of information that may distinguish some or all of the assets from each other. For example, the transaction originating communication device 290 may not possess information related to the relationship between the assets and the transaction destinations (e.g., which assets (or portions thereof) are related to which one(s) of the transaction destinations), or information related to the transaction destinations (e.g., information such as but not limited to identities, locations, etc., of the transaction destinations), and/or the like. In such implementations, without possessing information that distinguishes the assets from each other, the transaction originating communication device 290 may originate a transaction using fungible tokens to represent the assets and establish (and represent on the DLN) chains of custody of the assets from the transaction originating communication device 290 to the transaction destinations via the network of cascading intermediate entities 20Nm. The establishment (and representation on the DLN) of chains of custody of the assets represented on the DLN 200 by fungible tokens can allow the transaction originating communication device 290 to uncover or identify distinguishing characteristics of the assets (e.g., such as the above-noted information about the transaction destinations and/or relationship thereof with the assets). The establishment of the chains of custody may also allow the network of cascading intermediate entities 20Nm and/or the transaction destination communication devices 291a-291m to update their records with respect to the assets (e.g., ownership of the assets).

In some implementations, the transaction originating communication device 290 may be in possession of the above-noted information but may still establish (and represent on the DLN) the chains of custody of assets from the transaction originating communication device 290 to the transaction destinations using fungible tokens to represent the assets. The use of fungible tokens to represent the assets when establishing the chains of custody of the assets may be computationally more efficient and less burdensome on the DLN, as compared to, for example, the use of non-fungible tokens. In some implementations, the fungible tokens can contain less information related to the assets than non-fungible tokens do. Thus, computations performed by the DLN (e.g., by a self-executing code segment on the DLN) to establish on the DLN chains of custody of the assets may involve less processing power and/or memory space, as well as costs to transactions on the DLN (e.g., "gas" for Ethereum) (compared to computations involving non-fungible tokens).

In some implementations, the relationship between the assets and the transaction destinations can be one of ownership or otherwise (e.g., obligations, etc.). The relationship between the assets and the transaction destinations can also be an entitlement relationship (e.g., right to receive dividends, right to vote, etc.). In some implementations, the relationship of interest between the assets and the transaction destinations may be a relationship at a given point in time or at the occurrence of a certain event. As a non-limiting illustrative example, the assets can be securities or financial instruments (e.g., dividends, capital gains, interests, etc.) issued by a security issuer (e.g., transaction originating communication device 290) and the transaction destinations may be the owners of the securities with the right to receive the dividends at a specified point in time. The chains of custody established by the transaction originating communication device 290 may allow for the uncovering or identification of distinguishing characters of the (fungible) financial instruments (or assets in general), including which of the transaction destinations own how many of the instruments (or assets in general).

To establish the chains of custody, in some embodiments, the transaction originating communication device 290 may initially identify a unit of the fungible assets and generate or mint, using a processor (which may be or may not be part of the DLN 200), a fungible token for each unit of the fungible asset. The set of fungible tokens collectively represents the set of fungible assets on the DLN 200. In some implementations, the fungible token does not include any identifying information that identifies the transaction destination (or the entity that is the beneficial owner of the fungible token). For example, if the transaction originating communication device 290 is operated and/or managed by a securities issuer declaring a given amount of dividend per share for a total number of outstanding shares, a unit of the fungible assets is a single share, and the transaction originating communication device 290 (operated by the securities issuer or a related entity such as a local custodian of the fungible assets) may mint a fungible token for each unit of the fungible assets. In some implementations, the transaction destinations (or the ultimate entities) operating the transaction destination communication devices 291a-291m may be the owners or destinations of the entirety or at least a subset of the fungible assets.

After generating the fungible tokens, the transaction originating communication device 290 may then divide the total number of fungible tokens in proportion to the fungible asset holdings of the first set of communication devices 201a-201m. In other words, the first set of communication devices 201a-201m may be part of the chains of custody of the fungible assets held by the transaction originating communication device 290 for the benefit of the transaction destinations. The total number of fungible tokens may be divided according to the proportion of the fungible assets held by each entity operating first set of communication devices 201a-201m into a first set of groups of fungible tokens. For example, if the total number of the fungible tokens (e.g., measured in units of the asset) is T, the total number of fungible tokens may be divided up into sets of $a\_m=T^*x\_m$ where $x\_m$ is the proportion of fungible assets held by the first set of communication devices 201a-201m. The proportion of fungible assets held by each communication device from the first set of communication devices 201a-201m can be different or the same from each other. For example, if the total number of the fungible tokens one million tokens and the proportions of assets for each communication device from the first set of communication devices are 50%, 10%, and 40%, respectively, the first communication device, the second communication device, and the third communication device receives 500,000 tokens, 100,000 tokens, and 400,000 tokens. The transaction originating communication device then transfers, via the distributed ledger network, each group of fungible tokens (500,000 tokens, 100,000 tokens, and 400,000 tokens) to the first communication device, the second communication device, and the third communication device, respectively. The transaction originating communication device 290 may then transfer each set $a\_m$ of fungible tokens (and/or with an identifier of the transaction originating communication device 290, an identifier of each of the first communication device, the second communication device, and the third communication device, respectively and/or other information of the transaction originating communication device 290) to the respective communication device of the first set of communication devices 201a-201m. In some implementations, the transaction originating communication device 290 may, before dividing the set of fungible tokens, store data associated with the proportions of the fungible assets in a first instance of the distributed ledger database of the DLN 200. In some implementations, when the fungible tokens are held by a single communication device, the transaction originating communication device 290 may not divide the set of fungible tokens and instead, send the entire set of fungible tokens to that communication device.

With reference to the particular example in FIGS. 2A-2C, the local custodian LC1 (operating the transaction originating communication device 290) is in possession of one million shares of assets that belong to the ultimate owners or investors I1 through I12 (i.e., transaction destinations operating the transaction destination communication devices 291a-291m). To establish the chains of custody from the local custodian LC1 to the investors I1 through I12, the local custodian LC1 may mint or generate a fungible token for each unit (i.e., share) of the fungible assets or shares. The first set of entities (operating the first set of communication devices 201a-201m) may be the global custodians GC1-GC3 that are tasked with safe keeping of the fungible assets by their own customers (such as asset managers AM, investors I, asset distributors D, etc.) The transaction originating communication device 290) operated by the local custodian LC1 may then divide up the million fungible tokens in proportion to the share holdings of the global custodians GC1-GC3 that have a direct account relationship with the local custodian LC1. Since GC1 has half of a million shares, GC2 has a tenth of a million shares and GC3 has four tenths of a million shares, the transaction originating communication device 290 operated by local custodian LC1 may divide the fungible tokens into three sets of half a million tokens, a tenth of a million token and four tenths of a million token. The transaction originating communication device 290 operated by local custodian LC1 may transfer each set of tokens to the respective communication device from the first set of communication devices operated by that global custodian. In some implementations, when a first party has a direct account relationship with a second party, the first party has the identifying information of the second party, and/or the second party has established an account with the first party such that the first party can transfer tokens directly to the second party without intermediate parties.

In some implementations, the communication devices (between the set of cascading intermediate communication devices 20nm or between the transaction originating communication device 290 and the set of cascading intermediate communication devices 20nm) communicate with each other using a secure messaging protocol. Specifically, a communication device (the transaction originating communication device 290 or the set of cascading intermediate communication devices 20nm) can send (or broadcast) a message to every node or communication device on the DLN 200. In some implementations, a communication device (the transaction originating communication device 290 or the set of cascading intermediate communication devices 20nm) can send (or broadcast) a message to its neighboring communication devices or nodes on the DLN 200. All communication devices continuously forward the message to their neighboring communication devices until the intended receiving communication device receives it. Only the intended receiving communication device, however, has the key to decrypt the message. In some implementations, the message can include, but are not limited to, (1) a message identifier, (2) a topic of the message, (3) message body, (4) a "To" field: a recipient identifier, (5) a "From" field: an identifier of the sending communication device, (6) a message status field indicating whether the message has been received by the intended receiving communication device or an acknowledgement message has been received by the sending communication device from the intended receiving communication device, and/or the like. For example, when the transaction originating communication device 290 (operated by LC1) transfers a set of fungible tokens to a communication device from the first set of communication devices (e.g., 201a operated by GC1), the transaction originating communication device 290 can broadcast the message (with the fungible tokens) to all its neighboring communication devices. However, only the communication device 201a (operated by GC1) has the key to decrypt the message and receive the fungible tokens. In some implementations, to prevent a distributed denial-of-service (DDOS) attack, communication devices on the DLN 200 can use a proof-of-work (PoW) algorithm.

The communication device (the transaction originating communication device 290) or the set of cascading intermediate communication devices 20nm), including the sending communication device and the receiving communication device, can periodically check for message statuses in local database. When the sending communication device does not receive the acknowledgement message back from the receiving communication device, the sending communication device can resend the message. The communication device (the transaction originating communication device 290 or the set of cascading intermediate communication devices 20nm), including the sending communication device and the receiving communication device, can listen for all acknowledgement messages. The communication device can update its message status field once an acknowledgement message has been received. After the sending communication device sends the message and the receiving communication device receives the message, the receiving communication device can check its database whether the message exists (based on the message identifier). If the message is a new message, the receiving communication device can start action based on the message (e.g., further dividing the fungible tokens, transfers the fungible token to the next communication device, or record the fungible tokens in its database, etc.). The receiving communication device can also update its message status field if the message does not exist in its database. The receiving communication device can send an acknowledge message back to the sending receiving communication device. When the sending receiving communication device receives the acknowledge message, the receiving communication device can update the acknowledgement status in its database. In some implementations, the acknowledge message can include, but are not limited to, (1) a message identifier, (2) a topic of the message, and/or the like.

In some implementations, the establishment and representation on the DLN of chains of custody of assets from the transaction originating communication device 290 to the transaction destinations via the network of cascading intermediate entities 20nm may repeat as described above until all the fungible tokens generated by the transaction originating communication device 290 are distributed to the last set of communication devices 20Na-20Nm according to the proportions of asset holdings of the last set of entities operating the last set of communication devices 20Na-20Nm. Each time a fungible token is transferred from a sending communication device to a receiving communication device, the identifiers of the sending communication device and the receiving communication device can be recorded in the distributed ledger database of the DLN such that the chain of custody of the fungible token can be established.

For example, after the communication device from the first set communication devices 201a-201m receives its respective groups of fungible tokens (from the first set of groups of fungible tokens), the first set of communication devices 201a-201m may divide, according to the proportion of the fungible assets held by each entity operating the second set of communication devices 202a-202m, the first set of groups of fungible tokens into a second set of groups of fungible tokens. The first set communication devices 201a-201m may transfer each group of fungible tokens from the second set of groups of fungible tokens to the respective communication device of the third set of communication devices 203a-203m. When all of the fungible tokens generated by the transaction originating communication device 290 are distributed to the last set of communication devices 20Na-20Nm, the last set of communication devices 20Na-20Nm can divide the fungible tokens based on the proportion of the fungible assets held by each transaction destination operating the transaction destination communication devices 291a-291m, into a last set of groups of fungible tokens. In some implementations, the last set of communication devices 20Na-20Nm may transfer the last set of groups of fungible tokens to the respective communication device from the set of transaction destination communication devices 291a-291m. In other implementations, the last set of communication devices 20Na-20Nm may have a direct account relationship with the transaction destinations. The last set of communication devices 20Na-20Nm may record the transfer of the last set of groups of fungible tokens in the accounts of the transaction destinations and keep the last set of groups of fungible tokens in the last set of communication devices 20Na-20Nm without transferring to the transaction destination communication devices 291a-291m. The direct account relationship between the transaction destinations and the last set of communication devices 20Na-20Nm includes that (1) each communication device from the last set of communication devices 20Na-20Nm includes an identifier of a transaction destination and (2) can directly transfer fungible tokens to the transaction destination communication device associated with that transaction destination based on the identifier. In some implementations, when one communication device (the transaction originating communication device 290 or any communication device from the set of cascading intermediate communication device 20nm) transfers to another communication device (any communication device from the set of cascading intermediate communication device 20nm), the sending communication device may send an identifier of the sending communication device and an identifier of the receiving communication device together with the fungible tokens.

In some implementations, based on the proportions of the fungible assets held by each communication device, some communication devices from the set of cascading intermediate communication devices 20nm may not divide their fungible tokens and send the entire sets of the fungible tokens to another communication device(s). In some implementations, based on the proportions of the fungible assets held by each communication device, more than one communication devices from the set of cascading intermediate communication devices may combine their fungible tokens and send the combined fungible tokens to another communication device(s). In other words, not every communication device from the set of cascading intermediate communication devices 20nm divides its fungible tokens at every distribution event.

With reference to the particular example embodiment in FIGS. 2A-2C, the communication device 201a operated by the global custodian GC1 may divide the received half a million tokens in proportion to the share holdings of the asset managers (AM) that have a direct account relationship with the global custodian GC1. In other words, the communication device 201a operated by the global custodian GC1 may divide the half a million tokens into one set of two hundred thousand tokens, and two sets of one hundred and fifty thousand tokens, based on the respective proportion of the asset or share holdings of the asset managers, and transfer the sets of tokens, respectively, to the communication devices 202a-202m operated by AM1, AM2 and AM3. The communication device 201b operated by GC2 may transfer the one hundred thousand tokens to the communication device 20Ni from the network of cascading intermediate entities 20nm that has a direct account relationship with GC2 (i.e., transfer to the distributor D8). In this manner, all the fungible tokens generated by the transaction originating communication device 290 are distributed to the last set of communication devices 20Nm (or in general, to communication devices in the set of cascading intermediate communication devices 20nm that has a direct account relationship with the transaction destinations operating the transaction destination communication devices 291a-291m). In this example, the communication device 201c from the first set of communication devices and operated by the global custodian GC3 is also a communication device from the last set of communication devices 20Nm. The communication device 201c operated by GC3 has a direct account relationship with the transaction originating communication device 290 and a transaction destination communication device 291l. In this example, the communication devices in the set of cascading intermediate communication devices 20nm that has a direct account relationship with the transaction destinations operating the transaction destination communication devices 291a-291m include the last set of communication devices 20Nm and the communication device 201c (also referred to as the last set of communication devices 20Nm).

In some embodiments, the set of cascading intermediate communication devices 20nm can be configured to communicate with each other via the peer-to-peer connection of the DLN 200. The set of cascading intermediate communication devices 20nm can spread across various geographical locations and are not hierarchical in network topology (or physical connection). In some implementations, the set of cascading intermediate communication devices 20nm can be hierarchical in an order of data transmission. Stated differently, the cascading communication devices 20nm within the set of cascading intermediate communication devices 20nm can be at different levels in the order that the data are transmitted among the set of cascading intermediate communication devices 20nm. Such hierarchy of the set of cascading intermediate communication devices can be dynamic and change over time. In other words, a communication device from the set of cascading intermediate communication devices 20nm can be at a first hierarchical level at a first time and at a second hierarchical level at a second time. Such hierarchy of the set of cascading intermediate communication devices can be implicit in (or inferred from) the pattern of distributing and subdividing the fungible tokens, which can include, for example, lateral transfers (i.e., transfer of fungible tokens within the same level of communication devices) or bypassing communication devices in the set of cascading intermediate communication devices.

In some implementations, each time a set of fungible assets are to be distributed to transaction destinations (e.g., a distribution event or a dividend event), the pattern of distributing and subdividing the fungible tokens (or the order of data transmission) can trace a different pattern (or a pathway) through the set of cascading intermediate communication devices 20nm of the peer-to-peer network DLN 200, from which a hierarchy of token transfers (and therefore the chains of custody of the set of fungible assets) can be inferred. For distributions and divisions of different sets of fungible assets, the trace (or the pattern, or the pathways) may follow the exact same path of the set of cascading intermediate communication devices 20nm (reflecting the business relationships among the entities), or the traces (or the patterns) can be substantially different from one distribution event from the other distribution event. In other words, for different distribution events of different sets of fungible assets, for example, a communication device from the set of cascading intermediate communication devices 20nm may not be involved in a given distribution event and therefore skipped, the entirety of the communication devices at a level may not participate in the given distribution event and therefore skipped. The traces (or patterns, or pathways) through the set of cascading intermediate communication devices 20nm may be completely inverted from one distribution event to another distribution event. In other words, the traces (or patterns, or pathways) through the set of cascading intermediate communication devices 20nm can be any pattern.

For example, the pathway of a distribution event of fungible tokens may include a diamond pattern. Specifically, a first communication device from a set of cascading intermediate communication devices 20nm may divide the fungible tokens into a first set of fungible tokens, a second set of fungible tokens, and a third set of fungible tokens. The first communication device can send the first set of fungible tokens and the second set of fungible tokens to a second communication device from the set of cascading intermediate communication devices 20nm and a third communication device from the set of cascading intermediate communication devices 20nm, respectively. Subsequently, the second communication device and the third communication device can send the first set of fungible tokens and the second set of fungible tokens to a fourth communication device from the set of cascading intermediate communication devices 20nm. The first communication device can send the third set of fungible tokens to the fourth communication device without passing through cascading intermediate communication devices.

For another example, the pathway of a distribution event of fungible tokens may be circular "looping" relationships among the communication devices. Specifically, a first communication device from a set of cascading intermediate communication devices 20nm may send a first set of fungible tokens to a second communication device from the set of cascading intermediate communication devices 20nm. The first communication device may send a second set of fungible tokens to a third communication device from the set of cascading intermediate communication devices 20nm. The second communication device may divide the first set of fungible tokens to a third set of fungible tokens and a fourth set of fungible tokens. The second communication device may send the third set of fungible tokens back to the first communication device, which then divides the third set of fungible tokens. For example, during the cascading process a shareholder identified at a "lower" level could be a fund (or other type of collective investment vehicle) that hold shares in a security, and the financial entity that holds the accounting for that fund might be at a "higher" level.

In some implementations, a communication device from the set of cascading intermediate communication devices 20nm may be operated by a parent entity and its subsidiary entity. Therefore, the same communication device may appear multiple times and in different levels of the pathway of the distribution event.

In some implementations, when all the fungible tokens are distributed to the intermediate communication devices that have direct account relationship with the transaction destinations, these intermediate communication devices (i.e., the last set of communication devices 20Nm and the communication device 201c with reference to the example in FIG. 2A) may proceed with converting the fungible tokens to non-fungible tokens by incorporating identifying characteristics or information of the transaction destinations (or ultimate entities) to which the intermediate entities are privy. In some implementations, instead of converting the fungible tokens to non-fungible tokens, these intermediate communication devices (i.e., the last set of communication devices 20Nm and the communication device 201c) may generate new non-fungible tokens that include the identifying characteristics or information.

In some implementations, these intermediate communication devices can generate (or convert the fungible tokens to) the non-fungible token, each of which includes (1) an identifier of the transaction destination, (2) an identifier of the communication device (from these intermediate communication devices) that generates (or converts from the fungible tokens) the non-fungible token, (3) identifiers of the communication devices from the set of cascading intermediate communication devices 20nm that transferred any fungible tokens from the set of fungible tokens associated with that non-fungible token, and/or (4) a "value" parameter representing a number of the fungible tokens that is associated with that transaction destination. In other words, the quantity of the fungible tokens may be represented as a "value" parameter of the non-fungible token, but the non-fungible token does not include the associated fungible tokens. Therefore, the chain of custody of each fungible token can be established based on the single non-fungible token for a given transaction destination communication device and information contained in the non-fungible token (e.g., based on (1) an identifier of the transaction destination, (2) an identifier of the communication device (from these intermediate communication devices) that generates (or converts from the fungible tokens) the non-fungible token, and/or (3) identifiers of the communication devices from the set of cascading intermediate communication devices 20nm that transferred any fungible tokens from the set of fungible tokens associated with that non-fungible token.) In some implementations, the non-fungible token may include other data fields associated with the transaction destination or characteristic information associated with the transaction destination (e.g., the name of the transaction destination, the location of the transaction destination, the country of residence, the type of the entity of the transaction destination (e.g., corporation, pension fund, natural person, etc.), and/or the like). In some implementations, the chain of custody can start from the transaction originating communication device and end at the communication device that has a direct account relationship with the transaction destination (or the communication device from these intermediate communication devices that generates or converts from the fungible tokens the non-fungible token.)

For example, the last set of communication devices 20Nm with direct account relationship with the transaction destinations may have access to identifying or distinguishing characteristics of the transaction destinations, such as but not limited to the identities of the transaction destinations, the location (e.g., residency) of the transaction destinations, etc. The last set of communication devices 20Nm may then communicate or send the non-fungible tokens to the transaction originating communication device 290 (e.g., FIG. 2B). With the use of the non-fungible tokens, the transaction originating communication device 290 may then identify or uncover distinguishing characteristics of the fungible assets, examples of which include ownership (e.g., identities of the owners of the assets) and details related to the ownership (e.g., residency or location of the owners, etc.).

In some implementations, upon receiving the non-fungible tokens, the transaction originating communication device 290 can determine a second value (or a derivative value) based on information contained in each non-fungible token (e.g., the value parameter of the non-fungible token; or a first value) and an algorithm. Each non-fungible token from a set of non-fungible tokens corresponds to a second value (or a derivative value) from a set of values (or a set of derivative values). The transaction originating communication device 290 can record the second value (and store it locally at the transaction originating communication device 290 and/or the distributed ledger database) from the set of values with the non-fungible token from the set of non-fungible tokens as a second value parameter associated with that non-fungible token. In some implementations, the transaction originating communication device 290 may calculate the difference between the value parameter of the non-fungible token (or the first value) and the second value associated with that non-fungible token and record it as a third value associated with that non-fungible token (and store it locally at the transaction originating communication device 290 and/or the distributed ledger database). The third value associated with that non-fungible token is associated with to a subset of the fungible tokens. The transaction originating communication device 290 may send the non-fungible token, the second value and the third value associated with that non-fungible token to the communication device from the intermediate communication device(s) that has a direct account relationship with the transaction destination such that the communication device can record these values with the account of the transaction destinations (and store it locally at the intermediate communication device and/or the distributed ledger database). In some implementations, the transaction originating communication device 290 may send the non-fungible token, the second value and the third value associated with that non-fungible token to the communication device from the intermediate communication device(s) that has a direct account relationship with the transaction destination. The transaction originating communication device 290 may send the second value associated with that non-fungible token to a different entity on behalf of the transaction destination. In these implementations, the transaction destination is entitled to a number of fungible tokens equal to the third value of the non-fungible tokens. The number of fungible tokens equal to the third value of the non-fungible tokens is a subset of fungible tokens equal to the first value of the non-fungible tokens.

For example, the transaction originating communication device 290 can calculate the withholding tax (i.e., the second value) based on the number of shares (the "value" parameter of the non-fungible token) and the withholding tax (i.e., the second value) can differ based on the other information contained in the non-fungible token, such as the country of residence of the transaction destination and the type of transaction destination (e.g., corporate, pension fund, natural person, etc.). In a dividend event, the second value (or the derivative value) can determine the net amount of the dividend that should be distributed to the transaction destination (or the ultimate entity) along with the amount of total withholding tax that may be remitted to the tax authority.

In some implementations, the transaction originating communication device 290 may store, in a second instance of the distributed ledger database, data associated with the set of non-fungible tokens and the set of fungible tokens. For each non-fungible token from the set of non-fungible tokens, the data associated with that non-fungible token may include (1) an identifier of the transaction destination, (2) an identifier of the communication device (from these intermediate communication devices) that generates (or converts from the fungible tokens) the non-fungible token, (3) identifiers of the communication devices from the set of cascading intermediate communication devices 20$nm$ that transferred any fungible tokens from the set of fungible tokens associated with that non-fungible token, (4) a "value" parameter representing a number of the fungible tokens that is associated with that transaction destination, and/or (5) a second value (or a derivative value) calculated based on the value parameter of the non-fungible token.

The second instance of the distributed ledger database can be replicated, shared, synchronized, and transmittable among multiple communication devices from the set of cascading intermediate communication devices 20$nm$ of the DLN 200. The chain of custody of the fungible tokens can be established and represented via the second instance of the distributed ledger database of the DLN 200.

In some embodiments, the transaction destinations (or ultimate entities or owners of the fungible assets) can have accounts with the intermediate communication devices (i.e., the last set of communication devices 20Nm and the communication device 201$c$ with reference to the example in FIG. 2A) and the transfer of tokens are recorded by these intermediate communication devices (one level above the transaction destination communication devices 291$a$-291$m$) via the DLN 200. The transaction destination communication devices 291$a$-291$m$ may not participate in the DLN 200.

FIG. 2C shows an implementation alternative to the implementation described in FIG. 2B in the establishment of chains of custody of assets in the network of cascading communication devices in the distributed ledger-based network (DLN), and the identification of distinguishing characteristics of said assets, where the assets are represented on the DLN via tokens. Instead of sending the non-fungible tokens to the transaction originating communication device 290 as described with regards to FIG. 2B, the last set of communication devices 20Nm may communicate or send the non-fungible tokens to a designated recipient communication device 299. In these implementations, the designated recipient communication device 299 can be different from the transaction originating communication device 290. The designated recipient communication device 299 can be any communication device (or node) on the DLN 200. With the use of the non-fungible tokens, the designated recipient communication device 299 may then identify or uncover distinguishing characteristics of the fungible assets, examples of which include ownership (e.g., identities of the owners of the assets) and details related to the ownership (e.g., residency or location of the owners, etc.).

In some implementations, similar to the process and method performed by the transaction originating communication device 290 as described with regards to FIG. 2B, upon receiving the non-fungible tokens, the designated recipient communication device 299 can determine the second value (or a derivative value) based on information contained in each non-fungible token (e.g., the value parameter of the non-fungible token: or a first value) and an algorithm. The designated recipient communication device 299 can record the second value (and store it locally at the transaction originating communication device 290 and/or the distributed ledger database) from the set of values with the non-fungible token from the set of non-fungible tokens as a second value parameter associated with that non-fungible token. In some implementations, the designated recipient communication device 299 may calculate and record the third value (and store it locally at the designated recipient communication device 299 and/or the distributed ledger database). The designated recipient communication device 299 may send the non-fungible token, the second value and/or the third value associated with that non-fungible token to the communication device from the intermediate communication device(s) that has a direct account relationship with the transaction destination such that the communication device can record these values with the account of the transaction destinations (and store it locally at the intermediate communication device and/or the distributed ledger database). The designated recipient communication device 299 may send the second value associated with that non-fungible token to a different entity on behalf of the transaction destination. In some implementations, the designated recipient communication device 299 may store, in a second instance of the distributed ledger database, data associated with the set of non-fungible tokens and the set of fungible tokens. The second instance of the distributed ledger database can be replicated, shared, synchronized, and transmitted among multiple communication devices from the set of cascading intermediate communication devices 20$nm$ of the DLN 200. The chain of custody of the fungible tokens can be established and represented via the second instance of the distributed ledger database of the DLN 200.

For example, the designated recipient communication device 299 can calculate the withholding tax (i.e., the second value) based on the number of shares (the "value" parameter of the non-fungible token), and the withholding tax (e.g., the second value) can differ based on the other information contained in the non-fungible token, such as the country of residence of the transaction destination and the type of transaction destination (e.g., corporate, pension fund, natural person, etc.). In a dividend event, the second value (or the derivative value) can determine the net amount of the dividend that should be distributed to the transaction destination (or the ultimate entity) along with the amount of total withholding tax that may be remitted to the tax authority. In some implementations, the designated recipient (operating the designated recipient communication device 299) could be declared when the dividend event is declared, so that all participants (communication devices on the DLN 200) can send the non-fungible tokens to the designated recipient communication device 299. Alternatively, the transaction originating communication device 290 can receive the non-fungible tokens and then send them to the designated recipient communication device 299. In a dividend event, the designated recipient (operating the designated recipient communication device 299) can be referred to as the "withholding agent" (or WHT agent). In different countries, the role of the WHT agent can be performed by different entities in that market. In some countries, the local custodian is the WHT agent, but in other countries a different actor is the WHT agent.

Returning to FIG. 2A, in some embodiments, the privacy and confidentiality of the establishment and representation of the chains of custody of the assets may be enhanced with the use of zero knowledge proofs. In some embodiments, the set of fungible tokens a_m may be transferred from the transaction originating communication device 290 to the respective communication device of the first set of communication devices 201$a$-201$m$ via the use of fungible token commitments computed as follows: $Z_{a\_m}=H(S_{a\_m}\circledast P_{transferor}\circledast a\_m)$, where $P_{transferor}$ is the public key on the DLN 100 that is associated with the transaction originating communication device 290 (i.e., the transferor of the tokens). $S_{a\_m}$ is a random nonce, H is a cryptographic hashing function or algorithm (e.g., SHA-256), and $\circledast$ represents a combining operator (e.g., the concatenation operator |, etc.). $P_{transferor}$ can be the public key of an asymmetric cryptography key pair on the DLN 200

(or the DLN 100 described with regards to FIG. 1) that is associated with the transaction originating communication device 290. The fungible token commitment $Z_{a\_m}$ represents the set of fungible tokens a_m on the DLN, with the ownership of the fungible token commitment (and the set of fungible tokens a_m) being assigned to the transaction originating communication device 290 as a result of the use of the public key on the DLN 200 of the transaction originating communication device 290 in minting or generating the fungible token commitment $Z_{a\_m}$. In some implementations, the computation of the token commitment $Z_{a\_m}$ may include application of the hashing function on additional elements besides or instead of $S_{a\_m}$, $P_{transferor}$ and/or a_m. In some embodiments, the token commitment includes a random nonce (e.g., a securely and randomly generated serial number), a public identifier on the DLN of the transaction originating communication device 290 (e.g., the public key of the asymmetric cryptography key pair of the transaction originating communication device 290) and an amount or value of the tokens (e.g., a_m). In some implementations, the application of the hashing function in computing for the token commitments $Z_{a\_m}$ allows for the generation or minting of the token commitments without revealing the identities of the random nonce $S_{a\_m}$, the public key $P_{transferor}$ and/or the tokens a_m. That is, even when the transaction originating communication device 290 generates $Z_{a\_m}$ using its public account on the DLN, the random nonce $S_{a\_m}$, the public key $P_{transferor}$ and/or the tokens a_m, the amount or value of the tokens, may be kept secret on the DLN 200 (or the DLN 100 described with regards to FIG. 1). In some implementations, the token commitment $Z_{a\_m}$ itself may also be private or secret. i.e., may not be revealed publicly on DLN 200 (or the DLN 100 described with regards to FIG. 1). In some implementations, the generation or minting of the token commitments $Z_{a\_m}$ may be accomplished off-chain (i.e., off-the DLN). In some implementations, zero knowledge proofs method can be used in any transfer of fungible tokens within the set of cascading intermediate communication devices 20$nm$ by using the fungible token commitments calculation method $Z_{a\_m}=H(S_{a\_m}\circledast P_{transferor}\circledast a\_m)$ and based on a public identifier of the transferor of the fungible tokens and an amount or value of the tokens being transferred.

With reference to FIG. 2A, in some implementations, the transfer of the set of fungible tokens a_m from the transaction originating communication device 290 to the respective communication device of the first set of communication devices 201$a$-201$m$ may be accomplished on the DLN by the generation of new fungible token commitments that assign ownership of the set of fungible tokens a_m to the respective communication device of the first set of communication devices 201$a$-201$m$. It can be performed in conjunction with the invalidation or nullification of the existing token commitments that assigned ownership of the fungible tokens a_m to the transaction originating communication device 290. Such new fungible token commitments that assign ownership of each set of the fungible tokens a_m to a respective communication device of the first set of communication devices 201$a$-201$m$, may be generated by the transaction originating communication device 290, using a processor, as follows: $Z'_{a\_m}=H(S'_{a\_m}\circledast P_{201m}\circledast a\_m)$, where $S'_{a\_m}$ is a random nonce and $P_{201m}$ is the public key on the DLN 200 of the respective communication device of the first set of communication devices 201$a$-201$m$ (e.g., a public key of an asymmetric cryptography key pair). The nullifiers $N_{a\_m}$ that invalidate the existing token commitments $Z_{a\_m}$ may be computed via the application of the hashing function on the random nonce used to generate $Z_{a\_m}$, among other things. For example, the transaction originating communication device 290 may compute, using a processor, the nullifiers $N_{a\_m}$ as follows: $N_{a\_m}=H(S_{a\_m} \oplus V_{transferor})$, where $V_{transferor}$ is the private key of the private key-public key pair (i.e., an asymmetric cryptography key pair) that includes the public key $P_{transferor}$. The invalidation or nullification of the existing token commitments $Z_{a\_m}$ becomes effective when the self-executing code segment includes the nullifiers $N_{a\_m}$ into a nullifier data structure of the DLN. In other words, the presence of the nullifiers $N_{a\_m}$ in the nullifier data structure of the DLN can be taken as an indication that the token commitments $Z_{a\_m}$ are no longer valid.

In some implementations, the transfer of the set of fungible tokens a_m from the transaction originating communication device 290 to the respective communication device of the first set of communication devices 201a-201m may be effective after the transaction originating communication device 290 submits to the self-executing code segment on the DLN the token commitments $Z_{a\_m}$ and $Z'_{a\_m}$, the nullifier $N_{a\_m}$, and a ZKP that includes a proof, among other things, that each $Z'_{a\_m}$ includes the respective fungible token of the set of fungible tokens a_m. Upon verification of the ZKP by the self-executing code segment, in some implementations, the $Z'_{a\_m}$ may be added onto the token commitments data structure of the DLN, confirming that the set of fungible tokens a_m has been transferred from the transaction originating communication device 290 to the respective communication device of the first set of communication devices 201a-201m.

In some implementations, the establishment and representation on the DLN of chains of custody of assets from the transaction originating communication device 290 to the transaction destinations via the set of cascading intermediate communication devices 20nm may repeat as disclosed above until token commitments for each communication device of the last set of communication devices 291a-291m of the set of cascading intermediate communication devices 20nm are added onto the token commitments data structure of the DLN (or in general, token commitments for each communication device that has a direct account relationship with the transaction destinations are added onto the token commitments data structure of the DLN). For example, with reference to the particular example embodiment in FIGS. 2A-2B, the communication device 201a operated by the global custodian GC1 may divide the received half a million tokens in proportion to the share holdings of the asset managers (AM) that have a direct account relationship with the global custodian CG1 (i.e., AM1, AM2, and AM3). That is, the communication device 201a operated by the global custodian GC1 may divide the half a million tokens into one set of two hundred thousand tokens, and two sets of hundred fifty thousand tokens, based on the respective proportion of the asset or share holdings of the asset managers (AMs). The communication device 201a operated by the global custodian GC1 may then proceed with generating new token commitments as discussed above to transfer the sets of tokens to AM1, AM2 and AM3, generating a nullifier to nullify or invalidate the token commitment that was transferred to GC1 from the transaction originating communication device 290 operated by LC, (so that GC's ownership of the half a million tokens is no longer valid). The communication device 201a can submit the new tokens commitments to the self-executing code segment on the DLN so that the new token commitments are added onto the token commitments data structure of the DLN (e.g., confirming that ownership of the three sets of tokens belongs to AM1, AM2 and AM3, respectively). The communication device 201a operated by the global custodian GC1 may generate each new token commitment by applying the hashing function H to, among other things, the respective sets of tokens and the respective public keys on the DLN of each of AM1, AM2 and AM3, indicating that ownership of the sets of tokens has transferred to the respective asset managers. When submitting the new token commitments, the communication device 201a operated by the global custodian GC1 may also submit to the self-executing code segment a ZKP that, among other things, the communication device 201a generates each new token commitment by applying the hashing function H to, among other things, the respective sets of tokens that are to be transferred to the respective communication device 202a-202m operated by the asset manager. In this manner, all the fungible tokens generated by the transaction originating communication device 290 are distributed to the communication devices in the last set of communication devices 20Nm (or in general, to the communication devices in the set of cascading intermediate communication devices 20nm that has a direct account relationship with the transaction destinations).

Once all the fungible tokens are distributed to intermediate communication devices in the set of cascading intermediate communication devices 20nm that have direct account relationship with the transaction destinations, the intermediate communication devices (communication devices 20Nm and 201c in the example of FIG. 2A) may proceed with generating and transferring to the transaction originating communication device 290 or the designated recipient communication device 299 non-fungible tokens that incorporate identifying characteristics or information of the transaction destinations to which the intermediate entities are privy. For example, the intermediate communication devices with direct account relationship with the transaction destinations may have access to identifying or distinguishing characteristics of the transaction destinations, such as but not limited to the identities of the transaction destinations, the location (e.g., residency) of the transaction destinations, etc. As such, the intermediate communication devices may generate non-fungible tokens that include the identifying characteristics or information of the transaction destinations. Such non-fungible tokens may also include any information contained within the fungible tokens. The intermediate communication devices may then communicate or send the non-fungible tokens to the transaction originating communication device 290 (e.g., FIG. 2B) or the designated recipient communication device 299 (e.g., FIG. 2C). The intermediate communication devices may generate new token commitments as discussed above and use ZKPs to prove the identities of the transaction destinations without having to disclose any identifying information. As such, the use of fungible and non-fungible tokens as discussed above may allow for the uncovering or identification of distinguishing characteristics of otherwise fungible assets, examples of which include ownership (e.g., identities of the owners of the assets) of the assets and details related to the ownership (e.g., residency or location of the owners, etc.) of the assets.

FIG. 3 shows a flow chart illustrating a method of establishing chains of custody of assets in a network of cascading communication devices in the DLN, according to some embodiments. The method 300 can be executed at, for example, processors of multiple communication devices such as the communication devices 102a-102e in FIG. 1 in the distributed ledger-based network (DLN). With reference to the particular example embodiment in FIGS. 2A-2B, the method 300 can be executed at a processor of a transaction originating communication device 290.

At step 301, a processor at the transaction originating communication device can store data associated with a set of proportions of assets from a set of fungible assets in a first instance of distributed ledger database. Examples of such fungible assets include financial instruments (e.g., dividends, interest payments, capital gains, etc.), digital assets (e.g., coins), physical objects, and/or the like. In some implementations, fungible tokens represent assets that are interchangeable or indistinguishable. Fungible tokens can be of the same type and can be aggregated and/or divided. Examples of fungible tokens include, but are not limited to, an amount of a financial instrument, currency, shares, screws, reams of paper, and/or the like. Non-fungible tokens represent assets that are uniquely identifiable or distinguishable. Non-fungible tokens can have unique identifiers or serial numbers. In some implementations, the transaction originating communication device can be operated by an issuer. The transaction originating communication device is configured to communicate with a first set of communication devices (e.g., the first set of communication devices 201a-201m in FIGS. 2A-2B) from a set of cascading intermediate communication devices (e.g., 20nm in FIGS. 2A-2B). The transaction originating communication device stores, in a first instance of distributed ledger database, data associated with proportions of the fungible assets each communication device from the first set of communication devices receives. For example, the transaction originating communication device is configured to distribute and establish a chain of custody of one million tokens. The chain of custody of the one million tokens starts from the transaction originating communication device and ends at transaction destinations (operating transaction destination communication devices 291a-291m in FIGS. 2A-2B). In some implementations, the relationship between the tokens (or assets) and the transaction destinations can be one of ownership or otherwise (e.g., obligations, etc.). The relationship between the tokens (or assets) and the transaction destinations can also be an entitlement relationship (e.g., right to receive dividends, right to vote, etc.). In this example, a first communication device from the first set of communication devices receives a proportion of 50% of the one million tokens, a second communication device from the first set of communication devices receives a proportion of 10% of the one million tokens, and a third communication device from the first set of communication devices receives a proportion of 40% of the one million tokens. The processor at the transaction originating communication device stores, in the first instance of the distributed ledger database, each proportion from the set of proportions and an identifier of that communication device associated with that proportion from a set of identifiers.

At step 303, the processor at the transaction originating communication device divides the set of fungible tokens into a first set of groups of fungible tokens based on the data. Each proportion of assets from the set of proportions of assets is associated with a communication device from the first set of communication devices. The processor at the transaction originating communication device identifies a unit of the fungible assets and generates or mints a fungible token for each unit of the fungible asset. The set of fungible tokens collectively represents the set of fungible assets on the DLN. After generating the fungible tokens, the processor at the transaction originating communication device divides the total number of fungible tokens in proportion to the fungible asset holdings of the first set of communication devices. In other words, the first set of communication devices may be part of the chains of custody of the fungible assets held by the transaction originating communication device for the benefit of the transaction destinations. The total number of fungible tokens may be divided according to the proportion of the fungible assets held by each entity operating first set of communication devices into a first set of groups of fungible tokens. For example, if the total number of the fungible tokens one million tokens and the proportions of assets for each communication device from the first set of communication devices are 50%, 10%, and 40%, respectively, the first communication device, the second communication device, and the third communication device receives 500,000 tokens, 100,000 tokens, and 400,000 tokens. The transaction originating communication device then transfers, via the distributed ledger network, each group of fungible tokens (500,000 tokens, 100,000 tokens, and 400,000 tokens) to the first communication device, the second communication device, and the third communication device, respectively.

At step 305, the processor at the transaction originating communication device sends, via the distributed ledger-based network and based at least in part on an asymmetric cryptography key pair, each group of fungible tokens from the first set of groups of fungible tokens to a communication device (1) associated with that group of fungible tokens and (2) from the first set of communication devices. In some embodiments, the privacy and confidentiality of the establishment and representation of the chains of custody of the assets may be enhanced with the use of zero knowledge proofs (ZKP). The set of fungible tokens a_m may be transferred from the transaction originating communication device to the respective communication device of the first set of communication devices via the use of fungible token commitments computed as follows: $Z_{a\_m}=H(S_{a\_m} \circledast P_{transferor} \circledast a\_m)$, where $P_{transferor}$ is the public key on the DLN that is associated with the transaction originating communication device (i.e., the transferor of the tokens), $S_{a\_m}$ is a random nonce, H is a cryptographic hashing function or algorithm (e.g., SHA-256), and $\circledast$ represents a combining operator (e.g., the concatenation operator |, etc.). $P_{transferor}$ can be the public key of an asymmetric cryptography key pair on the DLN that is associated with the transaction originating communication device. The fungible token commitment $Z_{a\_m}$ represents the set of fungible tokens a_m on the DLN, with the ownership of the fungible token commitment (and the set of fungible tokens a_m) being assigned to the transaction originating communication device as a result of the use of the public key on the DLN of the transaction originating communication device in minting or generating the fungible token commitment $Z_{a\_m}$. In some implementations, the computation of the token commitment $Z_{a\_m}$ may include application of the hashing function on additional elements besides or instead of $S_{a\_m}$, $P_{transferor}$ and/or a_m. In some embodiments, the token commitment includes a random nonce (e.g., a securely and randomly generated serial number), a public identifier on the DLN of the transaction originating communication device (e.g., the public key of the asymmetric cryptography key pair of the transaction originating communication device) and an amount or value of the tokens (e.g., a_m). In some implementations, the application of the hashing function in computing for the token commitments $Z_{a\_m}$ allows for the generation or minting of the token commitments without revealing the identities of the random nonce $S_{a\_m}$, the public key $P_{transferor}$ and/or the tokens a_m. That is, even when the transaction originating communication device generates $Z_{a\_m}$ using its public account on the DLN, the random nonce $S_{a\_m}$, the public key $P_{transferor}$ and/or the tokens a_m, the amount or value of the tokens, may be kept secret on the DLN. In some implementations, the token commitment $Z_{a\_m}$ itself may also be private or secret, i.e., may not be revealed publicly on DLN. In some implementations, the generation or minting of the token commitments $Z_{a\_m}$ may be accomplished off-chain (i.e., off-the DLN). In some implementations, zero knowledge proofs method can be used in any transfer of fungible tokens within the set of cascading intermediate communication devices by using the fungible token commitments calculation method $Z_{a\_m}=H(S_{a\_m} \circledast P_{transferor} \circledast a\_m)$ and based on a public identifier of the transferor of the fungible tokens and an amount or value of the tokens being transferred.

Upon receiving the first set of groups of fungible tokens, each communication device from the first set of communication devices retrieves, from the distributed ledger database, data associated with a proportion of holdings in the first set of groups of fungible tokens by a second set of communication devices. For example, a fourth communication device from the second set of communication devices, a fifth communication device from the second set of communication devices, and a sixth communication device from the second set of communication devices receive proportions 40%, 30%, and 30% of the fungible tokens (e.g., 500,000 tokens) received by the first communication device from the first set of communication devices, respectively. The first communication device transfers 200,000 tokens, 150,000 tokens, and 150,000 tokens to the fourth communication device, the fifth communication device, and the sixth communication device, respectively. The second communication device from the first set of communication devices sends 100% of its tokens to a seventh communication device from the second set of communication devices. Thus, the seventh communication device receives 100,000 tokens. The third communication device (e.g., 201c in FIG. 2A) from the first set of communication device is also from the last set of communication devices and thus, the third communication device will keep its 400,000 tokens, and record that the transaction destination (e.g., 291l in FIG. 2A) is entitled to the 400,000 tokens. When transferring tokens (or recording the transaction destination), each communication device stores the number of tokens transferred, an identifier of the communication device that sends the tokens, and an identifier of the communication device that receives the tokens.

In some implementations, the set of cascading intermediate communication devices can be configured to communicate with each other via the peer-to-peer connection of the DLN. The set of cascading intermediate communication devices can spread across various geographical locations and need not be hierarchical in network topology (or physical connection). In some implementations, the set of cascading intermediate communication devices can be hierarchical in an order of data transmission. Stated differently, the set of cascading intermediate communication devices can be at different levels in the order that the data are transmitted among the set of cascading intermediate communication devices. Such hierarchy of the set of cascading intermediate communication devices can be dynamic and change over time. In other words, a communication device from the set of cascading intermediate communication devices can be at a first hierarchical level at a first time and at a second hierarchical level at a second time. Such hierarchy of the set of cascading intermediate communication devices can be implicit in (or inferred from) the pattern of distributing and subdividing the fungible tokens, which can include, for example, lateral transfers (i.e., transfer of fungible tokens within the same level of communication devices) or bypassing communication devices in the set of cascading intermediate communication devices. In the example above, the first communication device and the second communication device are at a hierarchical level (in the order of data transmission) different from the fourth communication device, the fifth communication device, the sixth communication device, and the seventh communication device. The third communication device is at the first hierarchical level and the last hierarchical level at the same time.

At step 307, the processor at the transaction originating communication device or the processor at the designated recipient communication device receives from the second set of communication devices, a set of non-fungible tokens for each group of fungible tokens from the second set of groups of fungible tokens. Each non-fungible token from the plurality of non-fungible tokens is non-divisible and associated with an identifier (1) uniquely identifying a transaction destination from a set of transaction destinations and (2) from a set of identifiers. The second plurality of communication devices does not include the transaction originating communication device. In some implementations, when all the fungible tokens are distributed to the intermediate communication devices that have direct account relationship with the transaction destinations, these intermediate communication devices (i.e., the last set of communication devices) converts the fungible tokens to non-fungible tokens by incorporating identifying characteristics or information of the transaction destinations (or ultimate entities). In some implementations, instead of converting the fungible tokens to non-fungible tokens, these intermediate communication devices (i.e., the last set of communication devices) generates new non-fungible tokens that include the identifying characteristics or information). The information associated with the non-fungible token includes (1) an identifier of the transaction destination, (2) an identifier of the communication device (from these intermediate communication devices) that generates (or converts from the fungible tokens) the non-fungible token, (3) identifiers of the communication devices from the set of cascading intermediate communication devices that transferred any fungible tokens from the set of fungible tokens associated with that non-fungible token, and/or (4) a "value" parameter representing a number of the fungible tokens that is associated with that transaction destination. In other words, the quantity of the fungible tokens may be represented as a "value" parameter of the non-fungible token, but the non-fungible token does not include the associated fungible tokens. Therefore, the chain of custody of each fungible token can be established based on the non-fungible token and information contained in the non-fungible token. In some implementations, the non-fungible token may include other data fields associated with the transaction destination or characteristic information associated with the transaction destination (e.g., the name of the transaction destination, the location of the transaction destination, the country of residence, the type of the entity of the transaction destination (e.g., corporation, pension fund, natural person, etc.), and/or the like). For example, processors at the third communication device, the fourth communication device, the fifth communication device, the sixth communication device, and the seventh communication device each generate a non-fungible token and sends to the transaction originating communication device or the designated recipient communication device.

At step 309, the processor at the transaction originating communication device or the processor at the designated recipient communication device stores, in a second instance of the distributed ledger database, data associated with the set of non-fungible tokens and a subset of the set of fungible tokens. The second instance of the distributed ledger database is transmittable among at least the first set of communication devices and the second set of communication devices. For each non-fungible token from the set of non-fungible tokens, the data associated with that non-fungible token may include (1) an identifier of the transaction destination, (2) an identifier of the communication device (from these intermediate communication devices) that generates (or converts from the fungible tokens) the non-fungible token, (3) identifiers of the communication devices from the set of cascading intermediate communication devices 20$nm$ that transferred any fungible tokens from the set of fungible tokens associated with that non-fungible token, (4) a "value" parameter representing a number of the fungible tokens that is associated with that transaction destination, and/or (5) a second value (or a derivative value) calculated based on the value parameter of the non-fungible token. Based on the non-fungible tokens from the last set of communication devices from the set of cascading intermediate communication devices, the processor at the transaction originating communication device or the designated recipient communication device identifies or uncovers distinguishing characteristics of the fungible assets, and thus establishes chains of custody of the fungible assets.

In some implementations, upon receiving the non-fungible tokens, the transaction originating communication device or the designated recipient communication device can determine a second value (or a derivative value) based on information contained in each non-fungible token (e.g., the value parameter of the non-fungible token; or a first value) and an algorithm. Each non-fungible token from a set of non-fungible tokens corresponds to a second value (or a derivative value) from a set of values (or a set of derivative values). The transaction originating communication device or the designated recipient communication device may calculate the difference between the value parameter of the non-fungible token (or the first value) and the second value associated with that non-fungible token and record it as a third value associated with that non-fungible token. The third value associated with that non-fungible token corresponds to a subset of the fungible tokens. The transaction originating communication device or the designated recipient communication device may send the non-fungible token, the second value and the third value associated with that non-fungible token to the communication device from the intermediate communication device(s) that has a direct account relationship with the transaction destination such that the communication device can record these values with the account of the transaction destinations. In some implementations, the transaction originating communication device or the designated recipient communication device may send the non-fungible token, the second value and the third value associated with that non-fungible token to the communication device from the intermediate communication device(s) that has a direct account relationship with the transaction destination. The transaction originating communication device or the designated recipient communication device may send the second value associated with that non-fungible token to a different entity on behalf of the transaction destination. In these implementations, the transaction destination is entitled to a number of fungible tokens equal to the third value of the non-fungible tokens. The number of fungible tokens equal to the third value of the non-fungible tokens is a subset of fungible tokens equal to the first value of the non-fungible tokens.

Application of Some Embodiments to Assets in Custodian Accounts

Some embodiments include a method to tokenize the ownership of an asset (such as a financial instrument) at a specified point in time, or tokenize the rights associated with an entitlement event at a specified point in time. The tokenized ownership rights or entitlements are distributed as fungible tokens that are subdivided through a network of financial intermediaries (or a network of cascading communication devices) and mapped through any intermediate securities or investment vehicles. The token subdivision and distribution process by a transaction originating communication device cascades through the network (or a distributed ledger based network (DLN)) until the ultimate owners (or transaction destinations) have been identified, ending with the exchange of the distributed fungible tokens for non-fungible (e.g., uniquely identifiable) tokens that identify each ultimate owner (or transaction destination) and the number of fungible tokens that were exchanged when creating the non-fungible token.

The tokens represent the ownership or entitlement at a specified point in time, implemented by querying the account structures of each financial institution (operating, for example, a transaction originating communication device 290 in FIG. 2B) during the cascading process of subdividing and distributing the fungible tokens. The query can be sent to the transaction originating communication device 290 or to the DLN. This is effectively a "snapshot" of each institution's accounts and their holdings as they relate to the asset, entity or event in question. Based on this "snapshot" of its accounts and holdings, the financial institution (operating, for example, a transaction originating communication device 290 in FIG. 2B) can determine how to subdivide its share of fungible tokens to its accounts, resulting in either cascading the subdivision and distribution process to the next level or exchanging some portion of its fungible tokens for one or more non-fungible tokens when an account is determined to be an ultimate owner (a transaction destination).

In one use case, the definition of an ultimate owner (or a transaction destination) is related to identifying the beneficial ownership of an asset or entity for purposes such as Know Your Customer (KYC) or anti-money laundering (AML) enforcement. In another use case, ultimate owners (or transaction destinations) are defined in relation to tax laws that are intended to identify the individuals or entities subject to a tax such as a withholding tax computed relative to an entitlement such as a dividend, interest payment or capital gain.

In some implementations, the net result is to establish a "chain of custody" for each of the holdings in an asset, entity or financial instrument at a specified point in time, spanning across the financial intermediaries (a set of cascading intermediate communication devices) and ending at each of the ultimate owners (transaction destinations). Each "chain of custody" is represented by the blockchain transactions that subdivide and distribute the fungible tokens and terminate at each ultimate owner (transaction destination) with the exchange for non-fungible tokens. In the use case of identifying owners and their ownership shares of an entitlement subject to withholding tax, the non-fungible token identifies the owner's country of residence and tax treaty category, to allow the appropriate withholding tax to be computed with respect to each ultimate owner's holdings and its country of residence and tax treaty category.

In some embodiments, the identity of each ultimate owner (transaction destination) may be securely held by the transaction destination communication device (operated by the financial institution) with the direct relationship of the owner (transaction destination), with only the owner's country of residence and tax treaty category reported for purposes of calculating the withholding tax: while providing means for a tax authority or other auditor to request the identity of the owner and digital representation of related legal documents such as the Country of Residence (COR) declaration from the financial institution with the direct relationship with the owner (transaction destination).

In some embodiments, the sequence of cascading fungible token distributions through blockchain transactions may be kept private through the use of Zero-Knowledge Proof (ZKP) technology. The same ZKP technology can also be used to protect the privacy of the blockchain transactions that exchange the fungible tokens for non-fungible tokens that identify the ultimate owners (or transaction destinations) subject to withholding tax. Further, calculation of withholding tax can be performed by the communication device distributing the entitlement on each non-fungible token and record the tax withheld as an attribute of that non-fungible token.

In some embodiments, systems disclosed herein may integrate with an electronic payment system to distribute the payments associated with the entitlement as a net amount after deducting the appropriate withholding tax. The integration with the electronic payment system can also directly send the withholding tax payment to the government or agent of the government. The electronic payment system could itself be a blockchain system where the payments are tokenized as a digital currency.

The disclosed embodiments provide major benefits in efficiency and cost reduction compared to current paper-based alternatives for use cases requiring identification of ultimate owners (or transaction destination) within a complex network of financial intermediaries (or the set of cascading intermediate communication devices). The current exchange of paper documents across the network of financial intermediaries (or the set of cascading intermediate communication devices) is inefficient, with intermediate calculations typically being done on spreadsheets and then hand-transcribed to paper documents which are subsequently forwarded to the next level up in the chain of custody. Even with some level of automation within a financial institution or across financial institutions (e.g., SWIFT messages), significant gaps can exist in the required information for different use cases, forcing a parallel paper-based workflow. Due to both commercial considerations and privacy requirements, there are additional and considerable constraints on flowing information across a network of financial intermediaries (or the set of cascading intermediate communication devices).

The introduction of derived or intermediate financial instruments or collective investment vehicles ("CIVs") into the chain of custody adds yet another degree of complexity to existing processes, whether paper-based or semi-automated. The relationships between the original asset and the derived or intermediate instruments or CIVs may be carefully tracked to identify the ultimate owners (or transaction destinations) and their ownership shares in the original asset or entity in question.

In some embodiments, automated techniques, systems and/or components (e.g., not using human intervention) can establish each "chain of custody" as a sequence of immutable blockchain transactions, dramatically reducing the time and effort to determine each "chain of custody" while greatly increasing trust and security in the results. The use of fungible and non-fungible tokens provides a clear delineation between the discovery process of tracing ownership shares through a complex network of intermediaries (or the set of cascading intermediate communication devices) and the eventual identification of the ultimate owners (or transaction destinations).

When the blockchain transactions are implemented with ZKP technology, the subdivision and distribution of the fungible tokens by the transaction originating communication device can retain the privacy of the commercial relationships while still providing guarantees that the process was correctly executed and all tokens (and therefore all shares in the asset or entity) have been accounted for throughout the process. In addition, the use of ZKP technology allows key characteristics of the ultimate owners (or transaction destinations) to be shared (e.g. country of residency, number of shares held, type of owner, etc.) without revealing the identities of the ultimate owners (or transaction destinations) while ensuring that this information is available to a legitimate authority accessing the detailed information.

For the withholding tax use case, in some embodiments, techniques, systems and/or components can achieve the benefits of "relief at source" within the context of the current financial system. The legal liabilities for withholding tax remain the same, the structure of relationships between financial intermediaries (or the set of cascading intermediate communication devices) remain the same, the use of intermediate securities or collective investment vehicles as conduits of entitlements remains the same, and the privacy of account relationships among the complex network of financial intermediaries remains the same. Some or all the benefits of working within the current financial system are achieved while dramatically streamlining the process of determining withholding tax, automatically providing legitimate relief of tax burden for qualified owners subject to tax, reducing the risk of withholding tax fraud for governments, and providing the means for automated reclaims in cases where "relief at source" is legally or practically not currently possible. In addition, the use of blockchain technology provides benefits of security and reliability compared to processing through a centralized infrastructure.

The use of fungible tokens throughout the cascading process of distributing dividends or other entitlements, and then exchanging for non-fungible tokens at the "leaf nodes" of the processing mesh, greatly reduces the required processing power and therefore the relative cost of using the blockchain network compared to using non-fungible tokens throughout the process.

Entitlement and Withholding Use Case

In some embodiments, the processing steps for the entitlement and withholding use cases are as follows:

1. In advance (typically annually), the financial intermediary with a direct relationship with an investor (person or entity) stores in its own database ("local database") the following information: name, address, account unique identifier, country of residency for tax purposes, taxpayer identifier, digital representation of the Country of Residency (COR) document issued by the investor's government authority, etc. This can be done for every investor that participate in this system.

2. In advance, each financial intermediary participating in the system registers with the blockchain network, and can optionally host its own node on this network. The registration process allows participating financial intermediaries to process transactions with other intermediaries based on their existing account relationships.

3. In advance, each financial institution intending to distribute entitlements through the system registers the securities or other financial instruments that can be the basis for the entitlement, providing a unique identifier for that security or other financial instrument. This may allow each financial intermediary to identify which of its accounts have holdings of that security or financial instrument at the time that an entitlement event is processed.

4. When a future entitlement is announced by the organization that is issuing the entitlement or its delegate in the blockchain network ("originating organization"), the entitlement is registered through a transaction on the blockchain with a unique identifier of the entitlement, the unique identifier of the security or other financial instrument, the unique identifier of the originating organization, the type of entitlement (e.g. stock dividend), the basis for each unit of the entitlement (e.g. each share of stock), the terms of the entitlement (e.g. $1 per share), the announcement date, effective date, record date (the date used to establish owners of record and their holdings eligible for the entitlement), respond by date (date when a response identifying ownership must be reported back to the institution issuing the entitlement), payment date (date when any payments associated with the entitlement may be issued), etc.

5. When the record date for an entitlement is reached, the cascading set of transactions to distribute the entitlement begins. Fungible tokens, one for each unit of the entitlement, are created (minted) by the organization (or its delegate) that is issuing the entitlement ("originating organization"). Then the originating organization divides the total amount of these tokens through blockchain transactions with each of the financial intermediaries where it has a direct account relationship with respect to the given security or other financial instrument. The account information is queried from that organization's existing database of accounts, reflecting the holdings of each account as of the entitlement's record date. This process can be triggered either by a manual process, or automatically based on the record date.

6. When a financial intermediary receives and accepts a transaction of fungible tokens related to an entitlement event, it inspects its local accounts as of the record date to identify the accounts and their holdings that are eligible for the entitlement. Since different financial intermediaries update their account information on different schedules, the query can be suspended until the account information is available, but no later than the "respond by" date defined by the entitlement. Depending on the information retrieved from the local account database, one or more of these actions are taken:

6a. If the account is held by another financial intermediary, a blockchain transaction is issued that distributes the quantity of fungible tokens corresponding to the holdings of that account as of the record date. This can result in the transfer of these fungible tokens to the other financial intermediary, which can respond by executing its own implementation of step 6.

6b. If the account represents a security or other financial instrument that is eligible for the entitlement, and this security or financial investment (the "downstream financial instrument") is not considered the taxable entity, then the financial intermediary maps the entitlement into equivalent shares of this downstream security or financial instrument. The financial intermediary then queries its account database for accounts that hold this downstream financial instrument. This results in one or more transactions dividing the fungible tokens and transferring these tokens to these downstream accounts, based on their relative holdings of the original security or financial instrument, with a reference to the original entitlement. Note that the division process may result in fractional tokens, and that in general fractional tokens are supported in all transactions.

6c. If the account represents a security or other financial instrument that is eligible for the entitlement, and this security or financial investment (the "downstream financial instrument") is considered the taxable entity, then the financial intermediary issues a transaction to exchange the fungible tokens allocated to the account for a non-fungible token with a value equal to the number of fungible tokens allocated to that account, a treaty category based on the type of security or other financial instrument, the country of residence based on the tax residence claimed by that security or financial instrument, the unique network ID of the financial intermediary making the exchange, and a unique identifier ("opaque identifier") of the account that only the financial intermediary can decode and map to this account. A tax authority or other auditor with legal authority to request the account information can request this detailed account information from the financial intermediary by referencing the opaque identifier.

6d. If the account represents an ultimate owner that is eligible for the entitlement, and the ultimate owner is considered the taxable person or entity, and the ultimate owner has agreed to participate in this process, then the financial intermediary issues a transaction to exchange the fungible tokens allocated to the account for a non-fungible token with a value equal to the number of fungible tokens allocated to that account, the unique network ID of the financial intermediary making the exchange, and a unique identifier ("opaque identifier") of the account that only the financial intermediary can decode and map to this account. For the withholding tax use case, the non-fungible token can also have the treaty category of the ultimate owner with respect to the entitlement, and the country of residence based on the tax residence claimed by that ultimate owner. A tax authority or other auditor with legal authority to request the account information can request this detailed account information from the financial intermediary by referencing opaque identifier. For an ultimate owner, the information gathered in step (1) can be supplied through an encrypted means to that tax authority or other auditor.

6e. If the account represents an ultimate owner that has not granted permission to participate in this process, or the account is held by a financial intermediary that is not participating in the blockchain network, or the account cannot be otherwise identified to the extent required by legal requirements or the requirements of participating in this process, or the "respond by" date of the entitlement event is past due, then the financial intermediary issues a transaction to exchange the fungible tokens allocated to the account for a special type of placeholder non-fungible token ("gray token") with a value equal to the number of fungible tokens allocated to that account. The "gray token" has an undefined treaty category, undefined country of residence, the reason for issuing the token (e.g. non-participating account, non-participating financial intermediary, "respond by" date past due), the unique network ID of the financial intermediary making the exchange, and a unique identifier ("opaque identifier") of the account that only the financial intermediary can decode and map to this account. A tax authority or other auditor with legal authority to request the account information can request this detailed account information from the financial intermediary by referencing opaque identifier. A purpose of the "gray token" is to allow for the completeness of the process of transforming all fungible tokens for an entitlement event into an equivalent amount of non-fungible token values, thus supporting an auditable reconciliation of the process for each entitlement event. Since a "gray token" provides no information to support a reduced withholding rate, the assumption when calculating a withholding tax on a "gray token" is to use the default tax rate applicable for that type of event and financial instrument.

7. When each non-fungible token is created (minted) through an exchange defined in step (6), the originating organization or alternatively the designated recipient organization is notified through electronic means of the exchange. Upon notification of the creation (minting) of the non-fungible token, or any time between the "respond by" date and "payment date" specified for the entitlement event, the originating organization or alternatively the designated recipient organization is able to calculate the entitlement amount and (in the withholding tax use case) the applicable withholding tax allocated to that non-fungible token based on information supplied by the non-fungible token such as the amount of equivalent fungible tokens (e.g. number of shares held by the account in a security), the country of residence supplied in the non-fungible token, tax treaty category supplied in the non-fungible token, and any other information supplied in the non-fungible token related to calculating the entitlement and any associated tax (e.g., withholding tax).

As additional step in the process after step (7) for the withholding tax use case, the originating organization or alternatively the designated recipient organization can issue blockchain transactions that update each non-fungible token with the amount of withholding tax that was calculated for that non-fungible token. If an audit of the information in a non-fungible token is requested by a tax authority or other auditor legally entitled to this information, a request can be made to the financial intermediary that minted the non-fungible token to access the account information held by that financial intermediary as defined in step (1) of the process. In an audit request, the "opaque identifier" of the account is used by the financial intermediary to map into its own local database of account information. The requested information can then be encrypted and transmitted electronically to the authorized requesting tax authority or other auditor. By querying the transactions on the blockchain and generating one or more reports, it may be possible to create an audit trail of the transactions that led to the determination of the ultimate owners (the taxable individuals or legal entities) and any withholding tax calculated.

Identifying Ultimate Owners Use Case

In some embodiments, for the use case of identifying ultimate owners (transaction destinations), the processing steps are as follows:

1. In advance (typically annually), the financial intermediary with a direct relationship with an investor (person or entity) stores in its own database ("local database") the following information: name, address, account unique identifier, country of residency for tax purposes, taxpayer identifier, digital representation of the Country of Residency (COR) document issued by the investor's government authority, etc. This is done for every investor that participate in this system.

2. In advance, each financial intermediary participating in the system registers with the blockchain network. and can optionally host its own node on this network. The registration process allows participating financial intermediaries to process transactions with other intermediaries based on their existing account relationships.

3. In advance, each financial institution intending to identify asset or entity owners through the system registers a unique identifier for the asset or entity that can be the basis for the entitlement, providing a unique identifier for that asset or entity. This may allow each financial intermediary to identify which of its accounts have holdings of that asset or entity at the time that a record of ownership is requested.

4. When a request for ownership records is issued by an organization or its delegate in the blockchain network ("originating organization"), the request is registered through a transaction on the blockchain with a unique identifier of the request, the unique identifier of the asset or entity, the unique identifier of the originating organization, the type of request, the basis for each unit of ownership (e.g. each share of stock), the announcement date, effective date, record date (the date used to establish owners of record and their holdings), respond by date (date when a response identifying ownership must be reported back to the originating institution), and any other information related to the request.

5. When the record date for the request is reached, the cascading set of transactions to distribute the ownership shares is started. Fungible tokens, one for each unit of ownership, are created (minted) by the originating organization (or its delegate). Then the originating organization divides the total amount of these tokens through blockchain transactions with each of the financial intermediaries where it has a direct account relationship with respect to the given asset or entity. The account information is queried from that organization's existing database of accounts, reflecting the holdings of each account as of the record date. This process can be triggered either by a manual process, or automatically based on the record date.

6. When a financial intermediary receives and accepts a transaction of fungible tokens related to the request, it inspects its local accounts as of the record date to identify the accounts and their holdings of the asset or entity in question. Since different financial intermediaries update their account information on different schedules, the query can be suspended until the account information is available, but no later than the "respond by" date defined by the entitlement. Depending on the information retrieved from the local account database, one or more of these actions are taken:

6a. If the account is held by another financial intermediary, a blockchain transaction is issued that distributes the quantity of fungible tokens corresponding to the holdings of that account as of the record date. This can result in the transfer of these fungible tokens to the other financial intermediary, which will respond by executing its own implementation of step 6.

6b. If the account represents a security or other financial instrument that has an ownership stake in the original asset or entity in question, and this security or financial investment (the "downstream financial instrument") is not considered the ultimate owner for purposes of this request, then the financial intermediary maps the ownership shares into equivalent shares of this downstream security or financial instrument. The financial intermediary then queries its account database for accounts that hold this downstream financial instrument. This results in one or more transactions dividing the fungible tokens and transferring these tokens to these downstream accounts, based on their relative holdings of the original asset or entity, with a reference to the original asset or entity. In some implementations, the division process may result in fractional tokens, and that in general fractional tokens are supported in all transactions.

6c. If the account represents a security or other financial instrument that has an ownership stake in the original asset or entity, and this security or financial investment (the "downstream financial instrument") is considered the ultimate owner for purposes of this request, then the financial intermediary issues a transaction to exchange the fungible tokens allocated to the account for a non-fungible token with a value equal to the number of fungible tokens allocated to that account, additional information about the ultimate owner based on the type of request, the unique network ID of the financial intermediary making the exchange, and a unique identifier ("opaque identifier") of the account that only the financial intermediary can decode and map to this account. A tax authority or other auditor with legal authority to request the account information can request this detailed account information from the financial intermediary by referencing the opaque identifier.

6d. If the account represents an ultimate owner for purposes of this request, and the ultimate owner has agreed to participate in this process, then the financial intermediary issues a transaction to exchange the fungible tokens allocated to the account for a non-fungible token with a value equal to the number of fungible tokens allocated to that account, additional information about the ultimate owner based on the type of request, the unique network ID of the financial intermediary making the exchange, and a unique identifier ("opaque identifier") of the account that only the financial intermediary can decode and map to this account. A tax authority or other auditor with legal authority to request the account information can request this detailed account information from the financial intermediary by referencing opaque identifier. For an ultimate owner, the information gathered in step (1) can be supplied through an encrypted means to that tax authority or other auditor.

6e. If the account represents an ultimate owner that has not granted permission to participate in this process, or the account is held by a financial intermediary that is not participating in the blockchain network, or the account cannot be otherwise identified to the extent required by legal requirements or the requirements of participating in this process, or the "respond by" date of the entitlement event is past due, then the financial intermediary issues a transaction to exchange the fungible tokens allocated to the account for a special type of placeholder non-fungible token ("gray token") with a value equal to the number of fungible tokens allocated to that account. The "gray token" has the reason for issuing the token (e.g. non-participating account, nonparticipating financial intermediary, "respond by" date past due), the unique network ID of the financial intermediary making the exchange, and a unique identifier ("opaque identifier") of the account that only the financial intermediary can decode and map to this account. A tax authority or other auditor with legal authority to request the account information can request this detailed account information from the financial intermediary by referencing opaque identifier. A purpose of the "gray token" is to ensure the completeness of the process of transforming all fungible tokens associated with this request into an equivalent amount of non-fungible token values, thus supporting an auditable reconciliation of the process.

7. When each non-fungible token is created (minted) through an exchange defined in step (6), the originating organization or alternatively the designated recipient organization is notified through electronic means of the exchange. Upon notification of the creation (minting) of the non-fungible token, or any time between the "respond by" date and "payment date" specified for the entitlement event, the originating organization or alternatively the designated recipient organization is able to calculate the ownership stake for each ultimate owner based on information supplied by each non-fungible token.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters and configurations described herein are meant to be exemplary and that the actual parameters and/or configurations will depend upon the specific application or applications for which the teachings is/are used. One will recognize or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embodied in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B): in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:

dividing, at a processor of a transaction originating communication machine, a plurality of fungible tokens into a first plurality of groups of fungible tokens;

sending, by the processor of the transaction originating communication machine, to communication machine from a first plurality of communication machines that is at a different hierarchical level in an order of data transmission than the transaction originating communication machine, and based at least in part on a first asymmetric cryptography key pair, the first plurality of groups of fungible tokens, the communication machine from the first plurality of communication machines storing an account identifier associated with a transaction destination from a plurality of transaction destinations, the first plurality of groups of fungible tokens from the plurality of fungible tokens being of a same type as a second fungible token from the plurality of fungible tokens;

receiving, by a processor of a communication machine from a second plurality of communication machines that is at a different hierarchical level in the order of data transmission than the first plurality of communication machines and based at least in part on a second asymmetric cryptography key pair, a second plurality of groups of fungible tokens;

generating, at the processor of the communication machine from the second plurality of communication machines using a smart contract at a distributed ledger-based network and based on the second plurality of groups of fungible tokens, a non-fungible token having at least:

(1) the account identifier uniquely identifying the transaction destination, (2) a value representing a number of the plurality of fungible tokens, and (3) characteristic information associated with the transaction destination;

exchanging, by the processor of the communication machine from the second plurality of communication machines, the second plurality of groups of fungible tokens for a plurality of non-fungible tokens, each non-fungible token from the plurality of non-fungible tokens being non-divisible and associated with the account identifier:

(1) uniquely identifying, without revealing, the transaction destination from the plurality of transaction destinations using a zero knowledge proof (ZKP) protocol and (2) from a plurality of account identifiers, the second plurality of communication machines not including the transaction originating communication machine; and sending, by the processor of the communication machine from the second plurality of communication machines to a processor of a designated recipient communication device via a distributed ledger-based network that is at a different hierarchical level in the order of data transmission than the second plurality of communication machines, and based at least in part on a third asymmetric cryptography key pair, the non-fungible token to establish a chain of custody of the plurality of fungible tokens from the transaction originating communication machine to the second plurality of communication machines, the second plurality of communication machines not including the transaction originating communication machine or the transaction destination.

2. The method of claim 1, wherein:

each fungible token from the plurality of fungible tokens is associated with a unit of a plurality of fungible assets.

3. The method of claim 1, wherein:

the plurality of fungible tokens does not include the account identifier uniquely identifying the transaction destination.

4. The method of claim 1, wherein:

the non-fungible token includes ownership information associated with the transaction destination.

5. The method of claim 1, wherein:

the account identifier uniquely identifying the transaction destination is associated with at least one of a name or a location.

6. The method of claim 1, wherein:

each communication machine from the second plurality of communication machines has a direct account relationship with the transaction destination.

7. The method of claim 1, wherein:

the transaction originating communication machine is associated with an issuer of financial instruments; and each transaction destination from the plurality of transaction destinations is associated with an owner of a subset of the financial instruments with a right to receive the subset of the financial instruments at a specified point of time.

8. The method of claim 1, wherein:

the communication machine from the first plurality of communication machines is at a first hierarchical level at a first time and at a second hierarchical level at a second time.

9. The method of claim 1, wherein:

a hierarchical level of the communication machine from the first plurality of communication machines is not associated with a physical connection or a geographical region of the communication machine.

10. The method of claim 1, wherein:

the plurality of transaction destinations does not operate commination machines that transmit data via the distributed ledger-based network.

11. A system comprising:

a non-transitory processor-readable medium of a transaction originating communication machine storing instructions, that when executed by a processor of the transaction originating communication machine, cause the processor of the transaction originating communication machine to perform operations including:

dividing a plurality of fungible tokens into a first plurality of groups of fungible tokens; and sending, to a communication machine from a first plurality of communication machines that is at a different hierarchical level in an order of data transmission than the transaction originating communication machine and based at least in part on a first asymmetric cryptography key pair, the first plurality of groups of fungible tokens, the communication machine from the first plurality of communication machines storing an account identifier associated with a transaction destination from a plurality of transaction destinations, the first plurality of groups of fungible tokens from the plurality of fungible tokens being a same type as a second fungible token from the plurality of fungible tokens; and a non-transitory processor-readable medium of a communication device from a second plurality of communication machines at a different hierarchical level in the order of data transmission than the first plurality of communication machines storing instructions, that when executed by a processor of the communication device from the first plurality of communication machines perform operations comprising:

receiving, based on a second asymmetric cryptography key pair, a second plurality of groups of fungible tokens;

generating a non-fungible token having (1) the account identifier, (2) a value representing a number of the plurality of fungible tokens, and (3) characteristic information associated with the transaction destination; and exchanging each non-fungible token from the plurality of non-fungible tokens being non-divisible and associated with the account identifier:

(1) uniquely identifying, without revealing, the transaction destination from the plurality of transaction destinations using a zero knowledge proof (ZKP) protocol and

(2) from a plurality of account identifiers, the second plurality of communication machines not including the transaction originating communication machine; and sending, to a processor of a designated recipient communication machine via a distributed ledger-based network and based on a third asymmetric cryptography key pair, the non-fungible token to establish a chain of custody of the plurality of fungible tokens from the transaction originating communication machine to the second plurality of communication machines devices, the second plurality of communication machines not including the transaction originating communication machine or the transaction destination.

12. The system of claim 11, wherein:

the communication machine from the first plurality of communication machines is a first virtual machine and the communication device from the second plurality of communication machines is a second virtual machine.

13. The system of claim 11, wherein:

the plurality of fungible tokens does not include the account identifier uniquely identifying the transaction destination.

14. The system of claim 11, wherein:

the non-fungible token includes ownership information associated with the transaction destination.

15. The system of claim 11, wherein:

the account identifier uniquely identifying the transaction destination is associated with at least one of a name or a location.

16. The system of claim 11, wherein:

each communication machine from the second plurality of communication machines has a direct account relationship with the transaction destination.

17. The system of claim 11, wherein:

the transaction originating communication machine is associated with an issuer of financial instruments; and each transaction destination from the plurality of transaction destinations is associated with an owner of a subset of the financial instruments with a right to receive the subset of the financial instruments at a specified point of time.

18. The system of claim 11, wherein:

the communication machine from the first plurality of communication machines is at a first hierarchical level at a first time and at a second hierarchical level at the second time.

19. The system of claim 11, wherein:

a hierarchical level of the communication machine from the first plurality of communication machines is not associated with a physical connection or a geographical region of the communication machines.

20. The system processor readable medium of claim 11, wherein:

the plurality of transaction destinations does not operate communication machines that transmit data via the distributed ledger-based network.

* * * * *